(12) United States Patent
Jang et al.

(10) Patent No.: US 12,298,810 B2
(45) Date of Patent: May 13, 2025

(54) ELECTRONIC APPARATUS INCLUDING A DIGITIZER

(71) Applicant: Samsung Display Co., LTD., Yongin-si (KR)

(72) Inventors: Seokwon Jang, Yongin-si (KR);
Hirotsugu Kishimoto, Yongin-si (KR);
Hyunjae Na, Yongin-si (KR);
Yong-Kwan Kim, Yongin-si (KR);
Sungguk An, Yongin-si (KR); Chul Ho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/412,707

(22) Filed: Jan. 15, 2024

(65) Prior Publication Data
US 2024/0302863 A1    Sep. 12, 2024

(30) Foreign Application Priority Data

Mar. 10, 2023    (KR) ........................ 10-2023-0032053

(51) Int. Cl.
*G06F 1/16* (2006.01)
*G06F 3/041* (2006.01)

(52) U.S. Cl.
CPC .......... *G06F 1/1641* (2013.01); *G06F 1/1652* (2013.01); *G06F 3/0412* (2013.01); *G06F 2203/04102* (2013.01); *G06F 2203/04107* (2013.01)

(58) Field of Classification Search
CPC .... G06F 1/1641; G06F 1/1652; G06F 3/0412; G06F 2203/04102; G06F 2203/04107
See application file for complete search history.

(56) References Cited

U.S. PATENT DOCUMENTS

| 11,281,346 | B2 | 3/2022 | Hirotsugu et al. |
| 11,314,367 | B2 | 4/2022 | Jung |
| 11,592,951 | B2 | 2/2023 | Kishimoto et al. |
| 11,600,208 | B2 | 3/2023 | La et al. |

(Continued)

FOREIGN PATENT DOCUMENTS

| KR | 20210016258 A | 2/2021 |
| KR | 20210133342 A | 11/2021 |

(Continued)

*Primary Examiner* — Sejoon Ahn
(74) *Attorney, Agent, or Firm* — CANTOR COLBURN LLP

(57) ABSTRACT

An electronic apparatus is provided and includes a display module having a folding region foldable with respect to a folding axis and including a first non-folding region and a second non-folding region spaced apart from each other along a second direction, and a digitizer disposed under the display module, and the digitizer includes a base part including base layers, first and second sensing coils disposed between the base layers and insulated from each other, and an upper reinforcement part including a first reinforcement layer and a second reinforcement layer each of which is disposed on an upper surface of the base part, and which are spaced apart from each other along the second direction with the folding region therebetween, wherein at least a portion of the base part containing either synthetic rubber or polydimethylsiloxane (PDMS).

20 Claims, 17 Drawing Sheets

(56) References Cited

U.S. PATENT DOCUMENTS

| | | | | |
|---|---|---|---|---|
| 2018/0364761 A1* | 12/2018 | Lin | ........................ | G06F 1/1652 |
| 2018/0373370 A1* | 12/2018 | Jung | ........................ | H04M 1/22 |
| 2018/0373371 A1* | 12/2018 | Kim | ...................... | G09G 3/3233 |
| 2018/0373372 A1* | 12/2018 | Kim | ...................... | H10K 59/873 |
| 2018/0373387 A1* | 12/2018 | Tsai | ...................... | G06F 3/0412 |
| 2018/0373467 A1* | 12/2018 | Tsutsumi | .............. | G06F 3/1201 |
| 2020/0073495 A1* | 3/2020 | Bok | ..................... | H10K 59/126 |
| 2020/0074136 A1* | 3/2020 | Shi | ...................... | G06V 40/1318 |
| 2020/0075638 A1* | 3/2020 | Zhao | ..................... | G06F 3/0412 |
| 2022/0066583 A1 | 3/2022 | Kishimoto et al. | | |
| 2022/0151085 A1 | 5/2022 | Jung et al. | | |

FOREIGN PATENT DOCUMENTS

| | | |
|---|---|---|
| KR | 102360203 B1 | 2/2022 |
| KR | 20220019188 A | 2/2022 |
| KR | 20220030438 A | 3/2022 |
| KR | 20220049066 A | 4/2022 |
| KR | 20220063834 A | 5/2022 |

\* cited by examiner

ELECTRONIC APPARATUS INCLUDING A DIGITIZER

This application claims priority to Korean Patent Application No. 10-2023-0032053, filed on Mar. 10, 2023, and all the benefits accruing therefrom under § 35 U.S.C. 119, the content of which in its entirety is herein incorporated by reference.

BACKGROUND

(1) Field

The present disclosure herein relates to an electronic apparatus including a digitizer, and more particularly, to an electronic apparatus including a digitizer with improved folding characteristics.

(2) Description of Related Art

In an information society, the importance of an electronic apparatus as a visual information transmission medium is emerging, wherein the electronic apparatus is activated in response to electrical signals that are received. The electronic apparatus includes a digitizer that detects an input applied from the outside of a display layer that is displaying an image.

The digitizer of the electronic apparatus may include various sensing coils in order to be activated in response to electrical signals. A region where the sensing coils are activated responds to signals received from outside the electronic apparatus.

SUMMARY

The present disclosure provides an electronic apparatus including a digitizer that detects external inputs with improved folding characteristics.

An embodiment of the invention provides an electronic apparatus including a display module having a folding region foldable with respect to a folding axis extending in a first direction, and a first non-folding region and a second non-folding region which are spaced apart from each other along a second direction crossing the first direction with the folding region therebetween, and a digitizer disposed under the display module, wherein the digitizer includes a base part including base layers, first and second sensing coils disposed between the base layers and insulated from each other, and an upper reinforcement part including a first reinforcement layer and a second reinforcement layer each of which is disposed on an upper surface of the base part and includes a different material from that of the base part, and which are spaced apart from each other along the second direction with the folding region therebetween, at least a portion of the base part containing either synthetic rubber or polydimethylsiloxane (PDMS).

In an embodiment, the synthetic rubber may be any one among styrene-butadiene rubber (SBR), butadiene rubber (BR), and butyl rubber.

In an embodiment, the reinforcement part may include either a reinforced fiber composite material or a ceramic-based material, and the reinforced fiber composite material may be either carbon fiber-reinforced plastic (CFRP) or glass fiber-reinforced plastic (GFRP).

In an embodiment, the digitizer may further include a lower reinforcement part including a third reinforcement layer and a fourth reinforcement layer each of which is disposed on a lower surface of the base part, and which are spaced apart from each other along the second direction with the folding region therebetween.

In an embodiment, the digitizer may further include a step compensation layer including a first compensation layer disposed between the first reinforcement layer and the second reinforcement layer to cover a portion, of the upper surface of the digitizer, exposed from the upper reinforcement part, and a second compensation layer disposed between the third reinforcement layer and the fourth reinforcement layer to cover a portion, of the lower surface of the digitizer, exposed from the lower reinforcement part.

In an embodiment, the step compensation layer may include any one among thermoplastic polyurethane (TPU), thermoplastic elastomer (TPE), and polyvinyl chloride gel (PVC Gel).

In an embodiment, the digitizer may include a folding part overlapping the folding region, a first non-folding part overlapping the first non-folding region, and a second non-folding part overlapping the second non-folding region, at least a portion of the base part may be defined by the folding part, a portion of the first non-folding part extending from the folding part, and a portion of the second non-folding part extending from the folding region, and a remaining portion of the base part may include a same material as the upper reinforcement part.

In an embodiment, at least a portion of the base part and a remaining portion of the base part may be connected to each other and have an integral shape.

In an embodiment, the base part may include a middle layer including the first sensing coils disposed on an upper surface thereof, and including the second sensing coils disposed on a lower surface thereof, an upper base layer disposed on the upper surface of the middle layer to cover the first sensing coils, and a lower base layer disposed on the lower surface of the middle layer to cover the second sensing coils, and the lower base layer may include a first lower base layer including an opening that overlaps the folding region and exposes the lower surface of the middle layer, and a second lower base layer disposed on a lower surface of the first lower base layer.

In an embodiment, at least a portion of the base part may include the upper base layer and the second lower base layer, and the first lower base layer may include a same material as the reinforcement part.

In an embodiment, coils, among the first and second sensing coils, overlapping the folding region may have same line widths as those of coils overlapping the first and second non-folding regions.

In an embodiment, each of the first sensing coils and the second sensing coils may have a line width of about 100 μm to about 400 μm.

In an embodiment, the base layers may include a middle layer including the first sensing coils disposed on an upper surface thereof, and including the second sensing coils disposed on a lower surface thereof, a first upper base layer disposed on the upper surface of the middle layer to cover the first sensing coils, a second upper base layer disposed on an upper surface of the first upper base layer, a first lower base layer disposed on the lower surface of the middle layer to cover the second sensing coils, and a second lower base layer disposed on a lower surface of the first lower base layer.

In an embodiment, the digitizer may further include a first bridge pattern disposed on the first upper base layer, and connected to any one of the first sensing coils through contact holes defined in the first upper base layer.

In an embodiment, the digitizer may further include a second bridge pattern disposed on the first lower base layer, and connected to any one of the second sensing coils through contact holes defined in the first lower base layer.

In an embodiment, coils, among the first sensing coils, overlapping the folding region may have a shape in which a valley and a crest are repeated, and a vertical distance between the valley and the crest is about 1 µm or less in the first direction.

In an embodiment, the first sensing coils and the second sensing coils may include copper (Cu).

In an embodiment, the electronic apparatus may further include a functional layer disposed under the digitizer and including a first part and a second part spaced apart from each other in a region overlapping the folding region, and the functional layer may include at least one of a heat dissipation layer, a cushion layer, or a shielding layer.

In an embodiment, the digitizer may detect an external input through electromagnetic resonance (EMR).

In an embodiment, when the folding region of the display module is folded to have a predetermined radius of curvature, the distance between the first non-folding region and the second non-folding region may be less than twice the radius of curvature.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
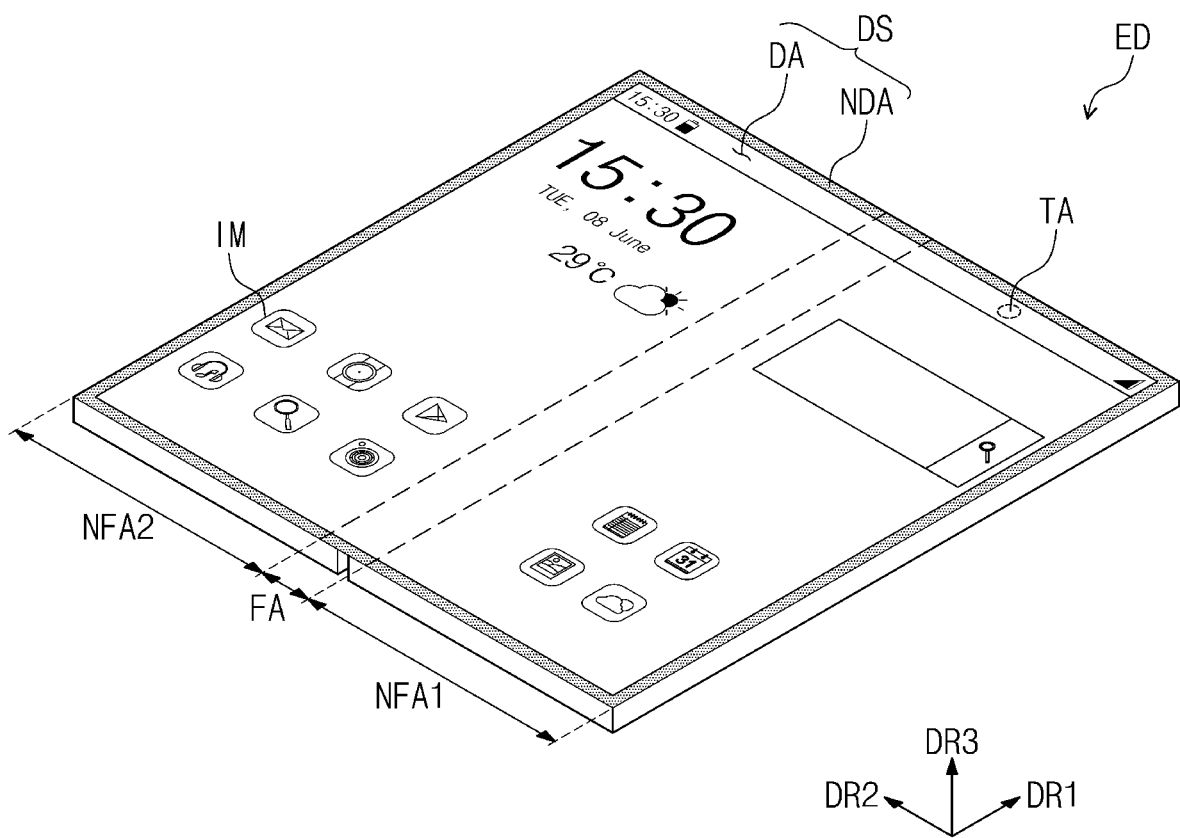
FIG. 1A is a perspective view of an electronic apparatus, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, it will be understood that when an element (or a region, a layer, a portion, or the like) is referred to as being related to another element, such as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the inventive concept. Similarly, a second element, component, region, layer or section may be termed a first element, component, region, layer or section.

The terminology used herein is for the purpose of describing particular embodiments only and is not intended to be limiting. As used herein, "a", "an," "the," and "at least one" do not denote a limitation of quantity, and are intended to include the plural forms as well, unless the context clearly indicates otherwise. Within the Figures and the text of the disclosure, a reference number indicating a singular form of an element may also be used to reference a plurality of the singular element.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be described with reference to the accompanying drawings.

Figure 1B:
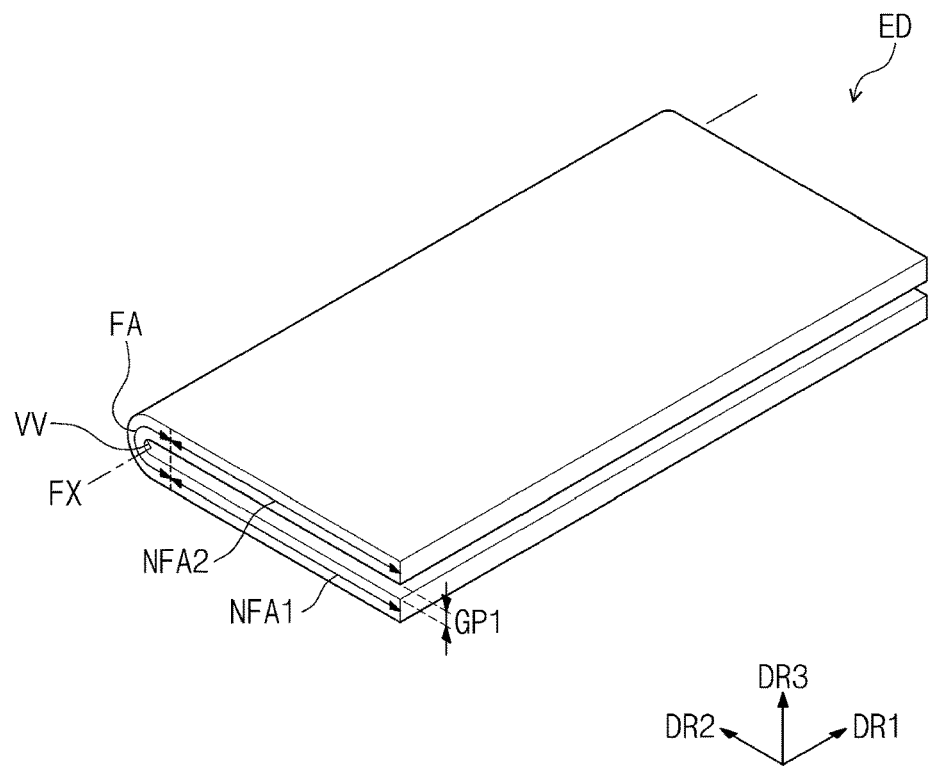
FIG. 1B is a perspective view of an electronic apparatus, according to an embodiment.
Figure 1C:
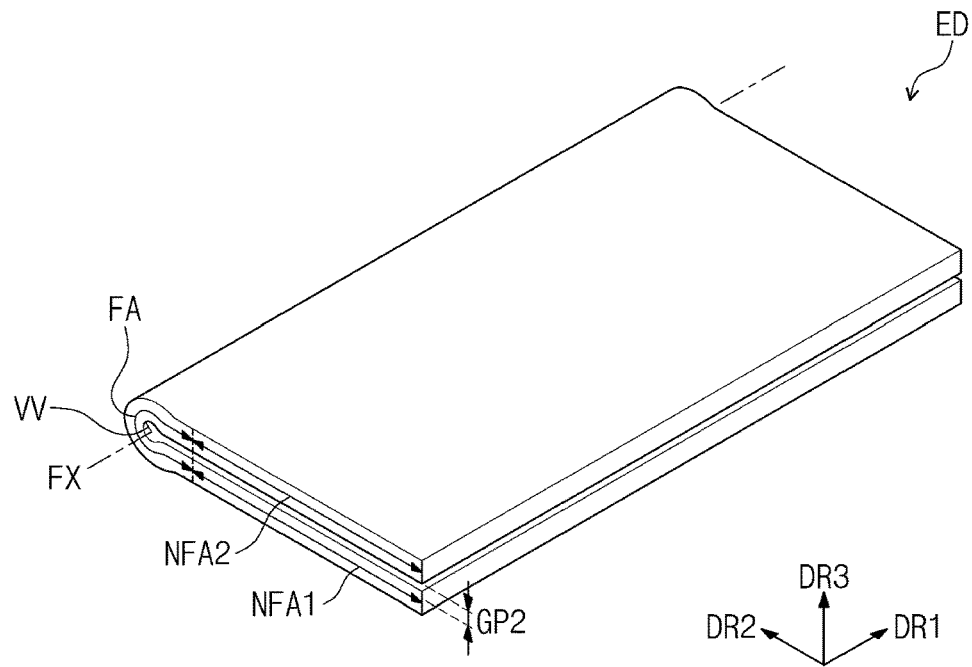
FIG. 1C is a perspective view of an electronic apparatus, according to an embodiment.

FIGS. 1A through 1C are perspective views of an electronic apparatus according to an embodiment of the invention. FIG. 1A illustrates the electronic apparatus in an unfolded state, and FIGS. 1B and 1C illustrate the electronic apparatus in a folded state.

Referring to FIGS. 1A through 1C, the electronic apparatus ED according to an embodiment may include a display surface DS defined by a first direction DR1 and a second direction DR2 crossing the first direction DR1. Through the display surface DS, the electronic apparatus ED may provide an image IM to a user.

In an embodiment, the display surface DS may include a display region DA and a non-display region NDA disposed adjacent to the display region DA. The display region DA may display the image IM, and the non-display region NDA may not display the image IM. The non-display region NDA may surround at least a portion of the display region DA. However, the invention is not limited thereto, and the shape of the display region DA and the shape of the non-display region NDA may be changed.

In an embodiment, the display surface DS may include a sensing region TA. The sensing region TA may be a partial region of the display region DA. The sensing region TA may have a higher light transmittance than those of other regions. Hereinafter, the other regions of the display region DA, except for the sensing region TA, may be defined as a general display region.

In an embodiment, optical signals such as visible light or infrared light may move to the sensing region TA. The electronic apparatus ED may capture external images through visible light passing through the sensing region TA, and/or determine accessibility of an external object through infrared light. FIG. 1A exemplarily illustrates one sensing region TA. However, the invention is not limited thereto, and the sensing region TA may be provided in plurality.

Hereinafter, in an embodiment, a direction substantially perpendicular to a plane defined by the first direction DR1 and the second direction DR2 is defined as a third direction DR3. The third direction DR3 is a criterion for distinguishing front and rear surfaces of each of the members. In this specification, the term "on a plane" may be defined as when viewed from the third direction DR3.

In an embodiment, the electronic apparatus ED may include a folding region FA and a plurality of non-folding regions NFA1 and NFA2. The non-folding regions NFA1 and NFA2 may include a first non-folding region NFA1 and a second non-folding region NFA2. The first non-folding region NFA1 and the second non-folding region NFA2 may be spaced apart from each other in the second direction DR2 with the folding region FA therebetween.

In an embodiment and as illustrated in FIG. 1B, the folding region FA may be folded with respect to a folding axis FX which is parallel to the first direction DR1. The folding region FA may have a predetermined curvature and a predetermined radius of curvature VV. A first distance GP1 between the first non-folding region NFA1 and the second non-folding region NFA2 may be substantially equal to twice the radius of curvature VV. According to an embodiment, the first non-folding region NFA1 and the second non-folding region NFA2 may face each other, and the electronic apparatus ED may be in-folded such that the display surface DS is not exposed to the outside.

In an embodiment and as illustrated in FIG. 1C, a second distance GP2 between the first non-folding region NFA1 and the second non-folding region NFA2 may be less than twice the radius of curvature VV. Therefore, in a folded state, the distance between the first non-folding region NFA1 and the second non-folding region NFA2 may be reduced. Accordingly, it may be possible to provide the electronic apparatus ED having a slim state when folded.

However, the invention is not limited thereto, and the electronic apparatus ED, according to an embodiment, may be out-folded such that the display surface DS is exposed to the outside. According to an embodiment, the electronic apparatus ED may repeat operations of unfolding and in-folding or unfolding and out-folding, but the invention is not limited thereto. According to an embodiment, the electronic apparatus ED may select any one among unfolding, in-folding, and out-folding operations.

Figure 2A:
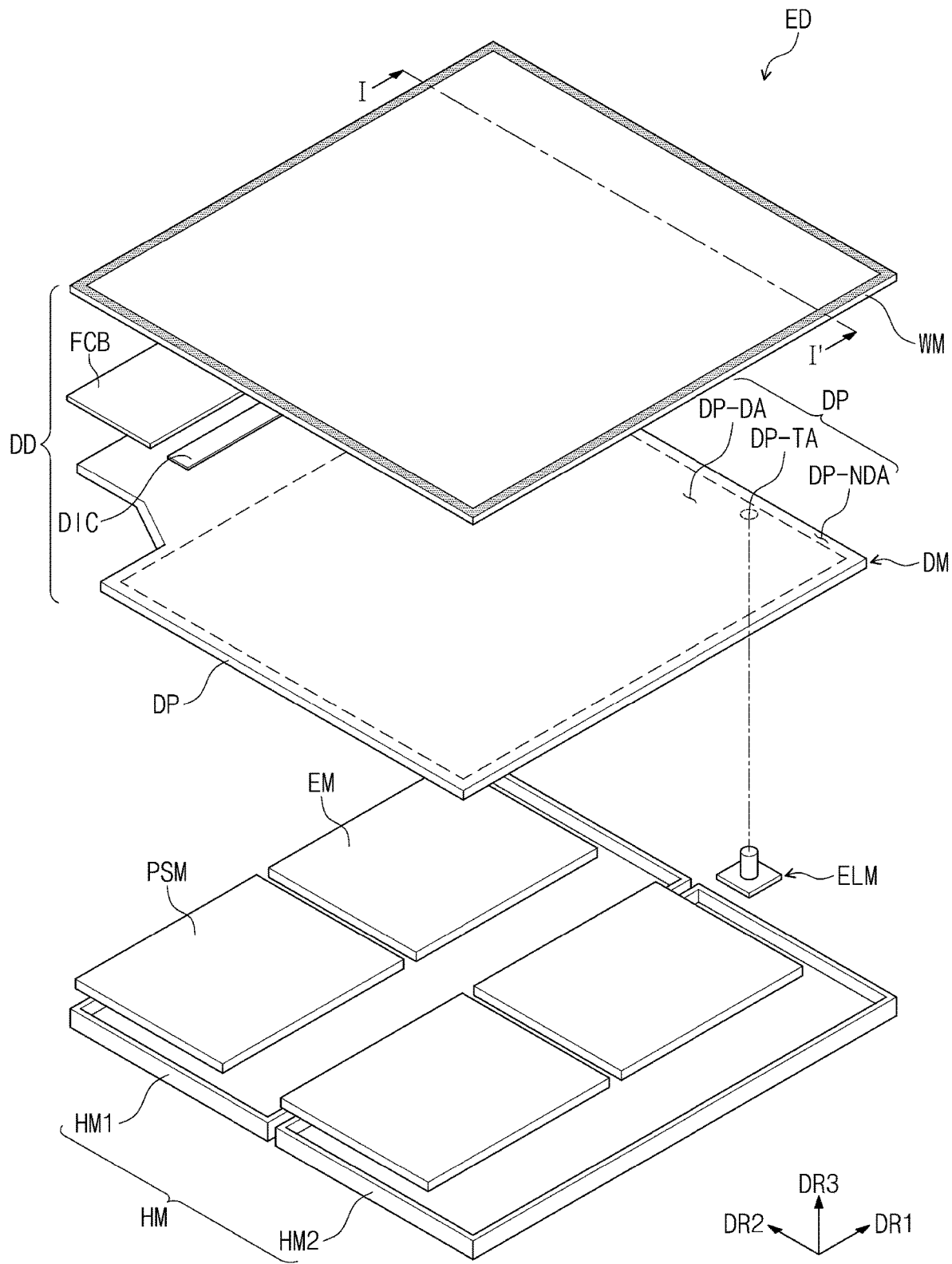
FIG. 2A is an exploded perspective view of an electronic apparatus, according to an embodiment.
Figure 2B:
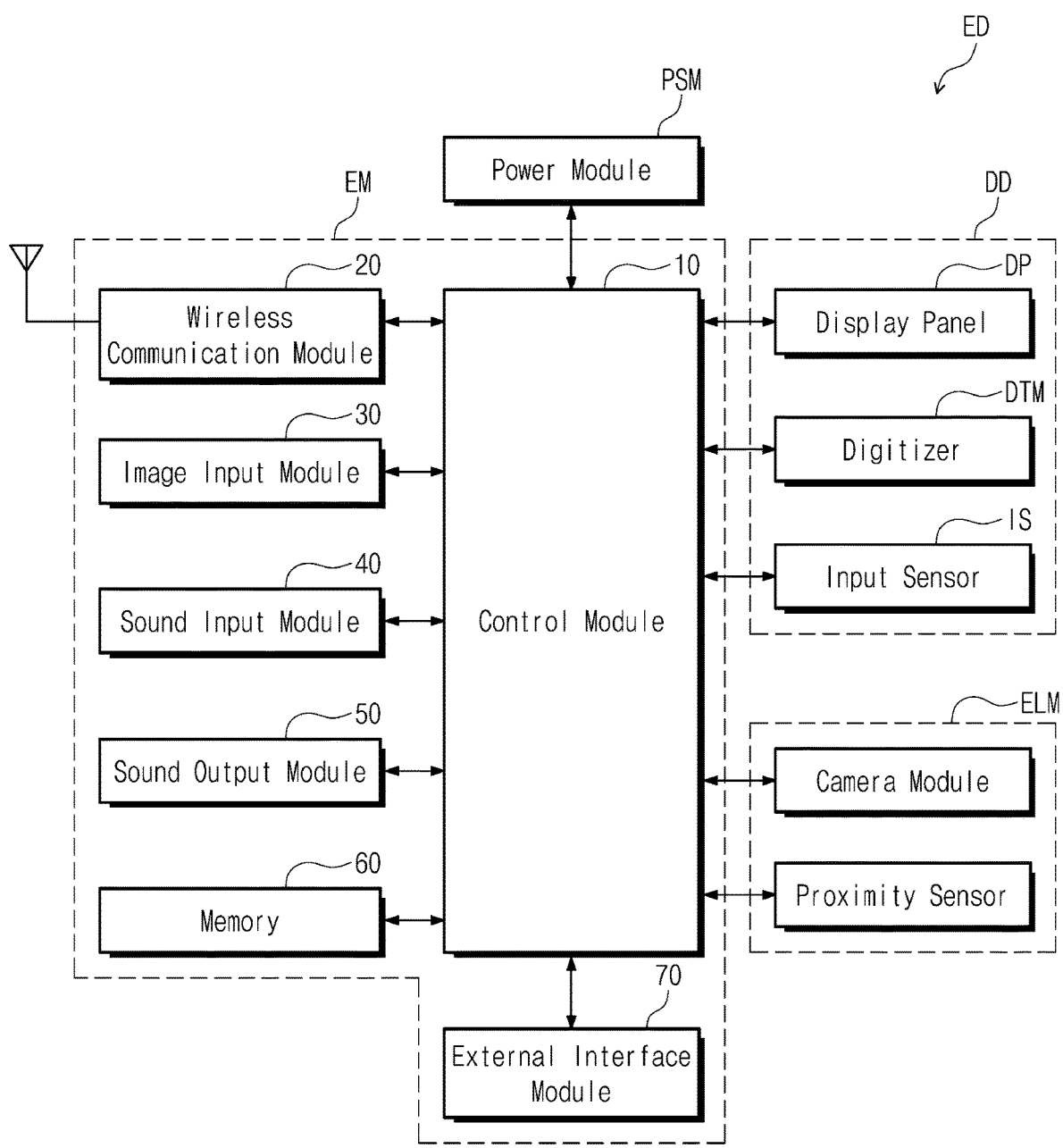
FIG. 2B is a schematic block diagram of an electronic apparatus, according to an embodiment.

FIG. 2A is an exploded perspective view of an electronic apparatus according to an embodiment. FIG. 2B is a block diagram of an electronic apparatus according to an embodiment.

In an embodiment and referring to FIGS. 2A and 2B, an electronic apparatus ED may include a display device DD, an electronic module EM, an electronic optical module ELM, a power module PSM, and a housing HM. The electronic apparatus ED according to an embodiment may further include a mechanical structure (for example, a hinge) to be coupled to the housing HM and to control folding operation of the display device DD.

In an embodiment, the display device DD generates an image and detects an external input. The display device DD includes a window WM and a display module DM. The window WM provides a front surface of the electronic apparatus ED. Detailed description of the window WM will be made later.

In an embodiment, the display module DM may include a display panel DP. FIG. 2A illustrates only the display panel DP among a stacked structure of the display module DM, but the display module DM may further include substantially a plurality of components disposed above the display panel DP. Detailed description of the stacked structure of the display module DM will be made later.

In an embodiment, the types of the display panel DP are not particularly limited. For example, the display panel DP may be an emission-type display panel such as an organic light-emitting display panel or a quantum-dot light-emitting display panel.

In an embodiment, the display panel DP includes a display region DP-DA and a non-display region DP-NDA respectively corresponding to the display region DA (see FIG. 1A) and the non-display region NDA (see FIG. 1A) of the electronic apparatus ED. In this specification, "a region/portion corresponding to a region/portion" means that a region/portion overlapping a region/portion, and is not limited to having the equal area.

In an embodiment and as illustrated in FIG. 2A, a driving chip DIC may be disposed on the non-display region DP-NDA of the display panel DP. A flexible circuit board FCB may be coupled to the non-display region DP-NDA of the display panel DP. The flexible circuit board FCB may be connected to a main circuit board. The main circuit board may be one of various electronic components constituting the electronic module EM.

In an embodiment, the driving chip DIC may include driving elements for driving pixels of the display panel DP such as a data driving circuit. FIG. 2A illustrates a structure in which the driving chip DIC is mounted on the display panel DP, but the invention is not limited thereto. For example, the driving chip DIC may be mounted on the flexible circuit board FCB.

In an embodiment and as illustrated in FIG. 2B, the display device DD may further include an input sensor IS and a digitizer DTM. The input sensor IS detects a user's input. The capacitive input sensor IS may be disposed above the display panel DP. The digitizer DTM detects an input of a stylus pen. The digitizer DTM according to an embodiment may detect an external input through electromagnetic resonance (EMR). The digitizer DTM may be disposed under the display panel DP.

In an embodiment, the electronic module EM may include a control module 10, a wireless communication module 20, an image input module 30, a sound input module 40, a sound output module 50, a memory 60, an external interface module 70, and the like. The electronic module EM may include the main circuit board, and the modules may be mounted on the main circuit board, and/or electrically connected to the main circuit board through the flexible circuit board. The input sensor IS and the digitizer DTM may each be connected to the main circuit board through a connector, etc. The electronic module EM is electrically connected to the power module PSM.

In an embodiment, the electronic module EM may be disposed in each of a first housing HM1 and a second housing HM2, and the power module PSM may be disposed in each of the first housing HM1 and the second housing HM2. Although not illustrated in the drawing, the electronic module EM disposed in the first housing HM1 and the electronic module EM disposed in the second housing HM2 may be electrically connected to each other through the flexible circuit board.

In an embodiment, the control module 10 controls overall operations of the electronic apparatus ED. For example, the control module 10 activates or deactivates the display device DD in accordance with a user's input. The control module 10 may control the image input module 30, the sound input module 40, the sound output module 50, etc. in accordance with a user's input. The control module 10 may include at least one microprocessor.

In an embodiment, the wireless communication module 20 may transmit/receive wireless signals to/from another terminal using Bluetooth and/or a Wi-Fi circuit. The wireless communication module 20 may transmit/receive sound signals using a general communication circuit. The wireless communication module 20 may include a plurality of antenna modules.

In an embodiment, the image input module 30 processes image signals to convert into image data displayable on the display device DD. The sound input module 40 receives external sound signals from a recording mode, a voice recognition mode, etc. through a microphone, and converts the signals into electrical voice data. The sound output module 50 converts sound data received from the wireless communication module 20 and/or sound data stored in the memory 60, and output the converted data to the outside.

In an embodiment, the external interface module 70 serves as an interface connected to an external charger, a wired/wireless data port, a card socket (for example, a memory card, a SIM/UIM card), etc.

In an embodiment, the power module PSM supplies power necessary for overall operations of the electronic apparatus ED. The power module PSM may include a normal battery device.

In an embodiment, the electronic optical module ELM may be an electronic component for outputting or receiving optical signals. The electronic optical module ELM may include a camera module and/or proximity sensor. The camera module captures external images through a sensing region DP-TA. The electronic optical module EML may be disposed under the display device DD, and may overlap the sensing region DP-TA.

In an embodiment, the housing HM is coupled to the window WM, and accommodates the aforementioned other modules. It is illustrated that the housing HM includes the first and second housings HM1 and HM2 separated from each other, but the invention is not limited thereto. The electronic apparatus ED, according to an embodiment, may further include a hinge structure for connecting the first and second housings HM1 and HM2 to each other.

Figure 3A:
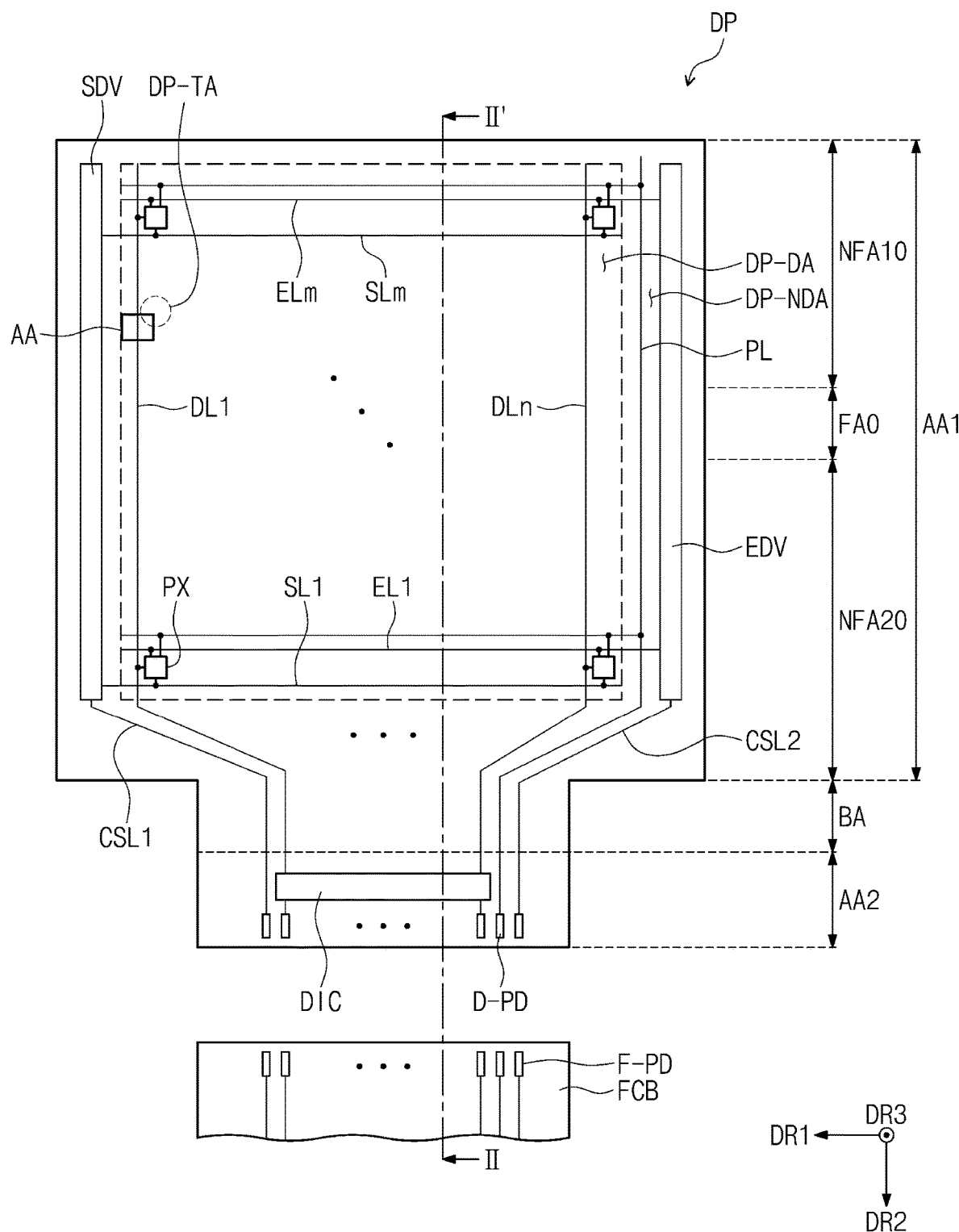
FIG. 3A is a plan view of a display panel of an electronic apparatus, according to an embodiment.
Figure 3B:
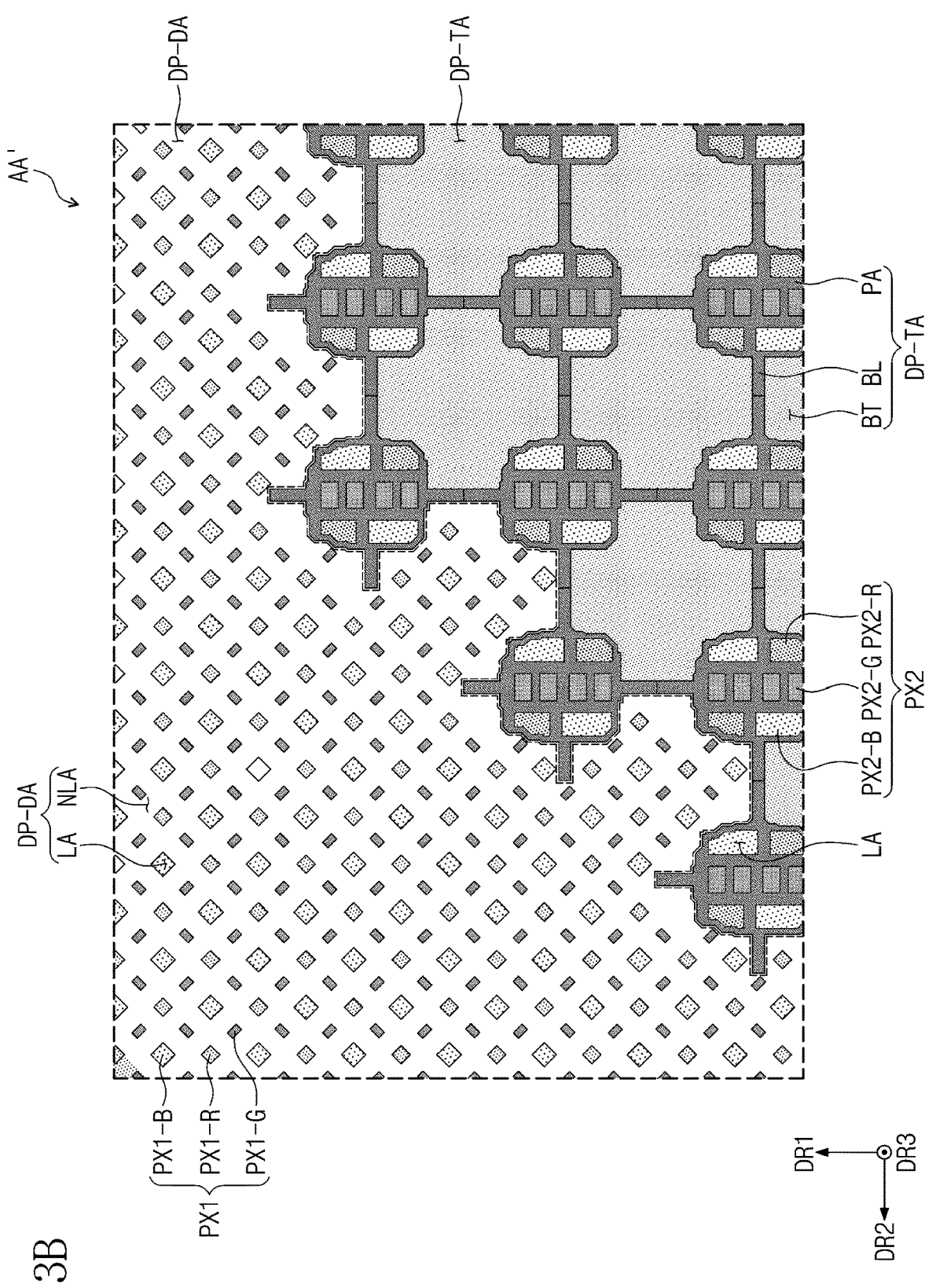
FIG. 3B is an enlarged plan view of a partial region of FIG. 3A, according to an embodiment.

FIG. 3A is a plan view of a display panel DP, according to an embodiment. FIG. 3B is an enlarged plan view of a partial region AA of FIG. 3A, according to an embodiment.

In an embodiment and referring to FIG. 3A, the display panel DP may include a display region DP-DA and a non-display region DP-NDA disposed around the display region DP-DA. The display region DP-DA and the non-display region DP-NDA are distinguished by the presence of a pixel PX. The pixel PX is disposed in the display region DP-DA. A scan drive SDV, a data driver, and an emission driver EDV may be disposed in the non-display region DP-NDA. The data driver may be a partial circuit configured in a driving chip DIC illustrated in FIG. 3A.

In an embodiment, the display panel DP includes a first non-bending region AA1, a second non-bending region AA2, and a bending region BA divided in a second direction DR2. The second non-bending region AA2 and the bending region BA may be a partial region of the non-display region DP-NDA. The bending region BA is disposed between the first non-bending region AA1 and the second non-bending region AA2.

In an embodiment, the first non-bending region AA1 is a region corresponding to the display surface DS in FIG. 1A. The first non-bending region AA1 may include a first non-folding region NFA10, a second non-folding region NFA20, and a folding region FA0. The first non-folding region NFA10, the second non-folding region NFA20, and the folding region FA0 respectively correspond to the first non-folding region NFA1, the second non-folding region NFA2, and the folding region FA in FIGS. 1A through 1C.

In an embodiment, the length of the bending region BA and the second non-bending region AA2 in a first direction DR1 may be smaller than the length of the first non-bending region AA1. The bending region BA, having a relatively smaller length in the first direction DR1, may be easily bent with respect to a bending axis extending in the first direction DR1.

In an embodiment, the display panel DP may include a plurality of pixels PX, a plurality of scan lines SL1 to SLm, a plurality of data lines DL1 to DLn, a plurality of emission lines EL1 to ELm, first and second control lines CSL1 and CSL2, respectively, a power line PL, and a plurality of display pads D-PD. Herein, m and n are natural numbers. The pixels PX may be connected to the scan lines SL1 to SLm, the data lines DL1 to DLn, and the emission lines EL1 to ELm.

In an embodiment, the scan lines SL1 to SLm may extend in the first direction DR1, and may be connected to the scan driver SDV. The data lines DL1 to DLn may extend in the second direction DR2, and may be connected to the driving chip DIC via the bending region BA. The emission lines EL1 to ELm may extend in the first direction DR1, and may be connected to the emission driver EDV.

In an embodiment, the power line PL may include a portion extending in the second direction DR2 and a portion extending in the first direction DR1. The portion extending in the first direction DR1 and the portion extending in the second direction DR2 may be disposed on different layers from each other. The portion of the power line PL extending in the second direction DR2 may extend toward the second non-bending region AA2 via the bending region BA. The power line PL may provide a first voltage to the pixels PX.

In an embodiment, the first control line CSL1 may be connected to the scan driver SDV, and may extend toward a lower part of the second non-bending region AA2 via the bending region BA. The second control line CSL2 may be connected to the emission driver EDV, and may extend toward the lower part of the second non-bending region AA2 via the bending region BA.

In an embodiment and on a plane, the display pads D-PD may be disposed adjacent to the lower part of the second non-bending region AA2. The driving chip DIC, the power line PL, the first control line CSL1, and the second control line CSL2 may be connected to the display pads D-PD. Substrate pads F-PD included in a flexible circuit board FCB may be electrically connected to the corresponding display pads D-PD through an anisotropic conductive adhesive layer.

In an embodiment and referring to FIG. 3B, a sensing region DP-TA (first region) may have a higher light transmittance and lower resolution than the display region DP-DA (second region). The light transmittance and the resolution are measured within a reference area. The sensing region DP-TA has a smaller share of light-blocking structure in the reference area than the display region DP-DA. The light-blocking structure may include a conductive pattern of a circuit layer, an electrode of a light-emitting element, a light-blocking pattern, etc. to be described later.

In an embodiment, the sensing region DP-TA has a lower resolution than the display region DP-DA in the reference area. The sensing region DP-TA has fewer pixels disposed within the reference area (or equal area) than the display region DP-DA.

In an embodiment and as illustrated in FIG. 3B, a first pixel PX1 is disposed in the display region DP-DA, and a second pixel PX2 is disposed in the sensing region DP-TA. When comparing the areas of pixels providing the same colors, the first pixel PX1 and the second pixel PX2 may have different light-emitting areas. The first pixel PX1 and the second pixel PX2 may have different arrangements.

In an embodiment, FIG. 3B illustrates light-emitting regions LA of the first pixel PX1 and the second pixel PX2 representing the first pixel PX1 and the second pixel PX2, respectively. The light-emitting regions LA may each be defined as a region in which an anode of a light-emitting element is exposed from a pixel-defining film. A non-light-emitting region NLA is disposed between the light-emitting regions LA in the display region DP-DA.

In an embodiment, the first pixel PX1 may include a first color pixel PX1-R, a second color pixel PX1-G, and a third color pixel PX1-B, and the second pixel PX2 may include a first color pixel PX2-R, a second color pixel PX2-G, and a third color pixel PX2-B. The first color pixel PX1-R and the first color pixel PX2-R may provide red light, the second color pixel PX1-G and the second color pixel PX2-G may provide green light, and the third color pixel PX1-B and the third color pixel PX2-B may provide blue light.

In an embodiment, the sensing region DP-TA may include a pixel region PA, a wiring region BL, and a transmission region BT. The second pixel PX2 is disposed in the pixel region PA. It is illustrated that two first color pixels PX2-R, four second color pixels PX2-G, and two third color pixels PX2-B are disposed in one pixel region PA, but the invention is not limited thereto.

In an embodiment, a conductive pattern, a signal line, and/or a light-blocking pattern related to the second pixel PX2 are disposed in the pixel region PA and the wiring region BL. The light-blocking pattern may be a metal pattern, and may substantially overlap the pixel region PA and the wiring region BL. The pixel region PA and the wiring region BL may be non-transmission regions.

In an embodiment, the transmission region BT is substantially a region where optical signals pass through. Since the second pixel PX2 is not disposed in the transmission region BT, the conductive pattern, the signal line, or the light-blocking pattern is disposed therein. Therefore, the transmission region BT increases the light transmittance of the sensing region DP-TA. According to an embodiment, the electronic optical module ELM described with reference to FIG. 2A overlaps the sensing region DP-TA having a high light transmittance, thereby improving efficiency of optical signal reception.

Figure 4:
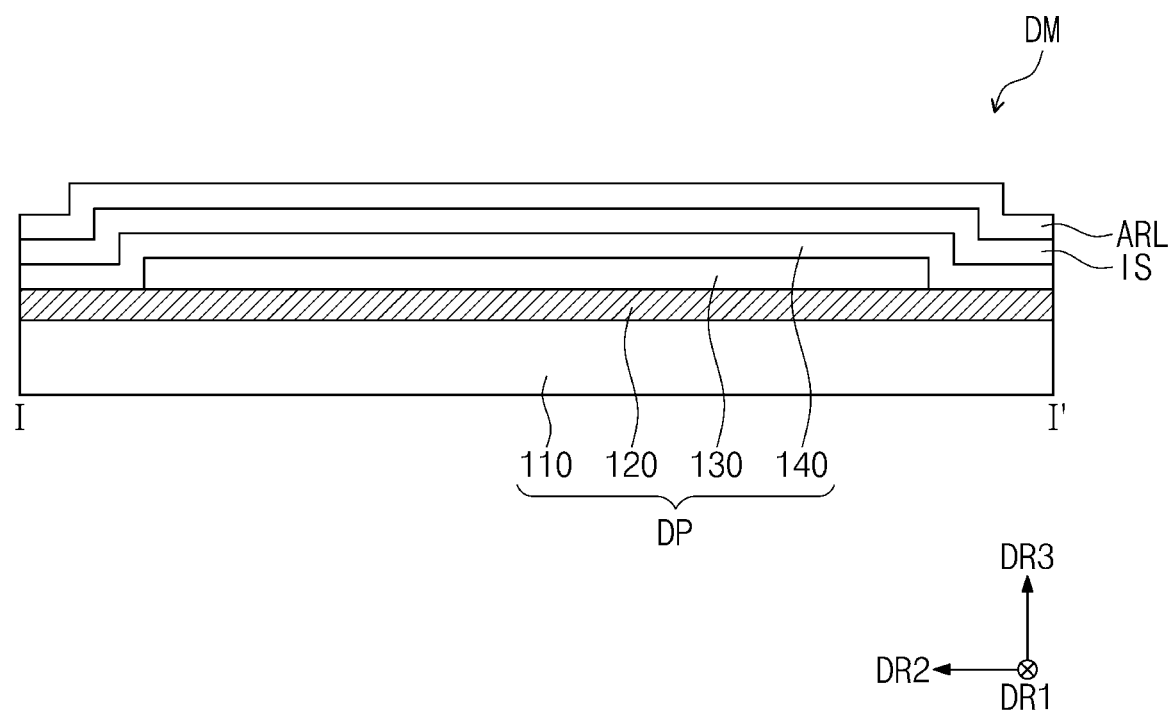
FIG. 4 is a cross-sectional view taken along line I-I' of FIG. 2A, according to an embodiment.

FIG. 4 is a cross-sectional view taken along line I-I' of FIG. 2A, according to an embodiment.

In an embodiment and referring to FIG. 4, the display module DM may include a display panel DP, an input sensor IS, and an anti-reflection layer ARL. The display panel DP may include a base layer 110, a circuit layer 120, a light-emitting element layer 130, and an encapsulation layer 140.

In an embodiment, the base layer 110 may provide a base surface on which the circuit layer 120 is disposed. The base layer 110 may be a flexible substrate capable of bending, folding, rolling, etc. The base layer 110 may be a glass substrate, a metal substrate, and/or a polymer substrate. However, the invention is not limited thereto, and the base layer 110 may be an inorganic layer, an organic layer, and/or a composite material layer.

In an embodiment, the base layer 110 may have a multi-layer structure. For example, the base layer 110 may include a first synthetic resin layer, a multi-layer and/or single-layer inorganic layer, and a second synthetic resin layer disposed on the multi-layer or single-layer inorganic layer. The first and second synthetic resin layers may each include a polyimide-based resin, and the material is not particularly limited.

In an embodiment, the circuit layer 120 may be disposed on the base layer 110. The circuit layer 120 may include an insulation layer, a semiconductor pattern, a conductive pattern, a signal line, and the like.

In an embodiment, the light-emitting element layer 130 may be disposed on the circuit layer 120. The light-emitting element layer 130 may include a light-emitting element. For example, the light-emitting element may include an organic light-emitting material, an inorganic light-emitting material, an organic-inorganic light-emitting material, quantum dots, quantum rods, a micro-LED, and/or a nano-LED.

In an embodiment, the encapsulation layer 140 may be disposed on the light-emitting element layer 130. The encapsulation layer 140 may protect the light-emitting element layer 130 from moisture, oxygen, and foreign substances such as dust particles. The encapsulation layer 140 may include at least one inorganic layer. The encapsulation layer 140 may include a stacked structure of an inorganic layer/organic layer/inorganic layer.

In an embodiment, the input sensor IS may be directly disposed on the display panel DP. The display panel DP and the input sensor IS may be formed through a continuous process. Herein, to be "directly disposed" may mean that there is no intervening component disposed between the input sensor IS and the display panel DP. That is, there may be no separate adhesive layer disposed between the input sensor IS and the display panel DP.

In an embodiment, the anti-reflection layer ARL may be directly disposed on the input sensor IS. The anti-reflection layer ARL may decrease the reflectance for external light incident from the outside of the display device DD (see FIG. 1). The anti-reflection layer ARL may include color filters. The color filters may have a predetermined arrangement. For example, the color filters may be arranged in consideration of light-emitting colors of pixels included in the display panel DP. In addition, the anti-reflection layer ARL may further include a black matrix adjacent to the color filters.

According to an embodiment, the positions of the input sensor IS and the anti-reflection layer ARL may be switched. According to an embodiment of the inventive concept, the anti-reflection layer ARL may be replaced by a polarizing film. The polarizing film may be bonded to the input sensor IS through an adhesive layer.

Figure 5A:
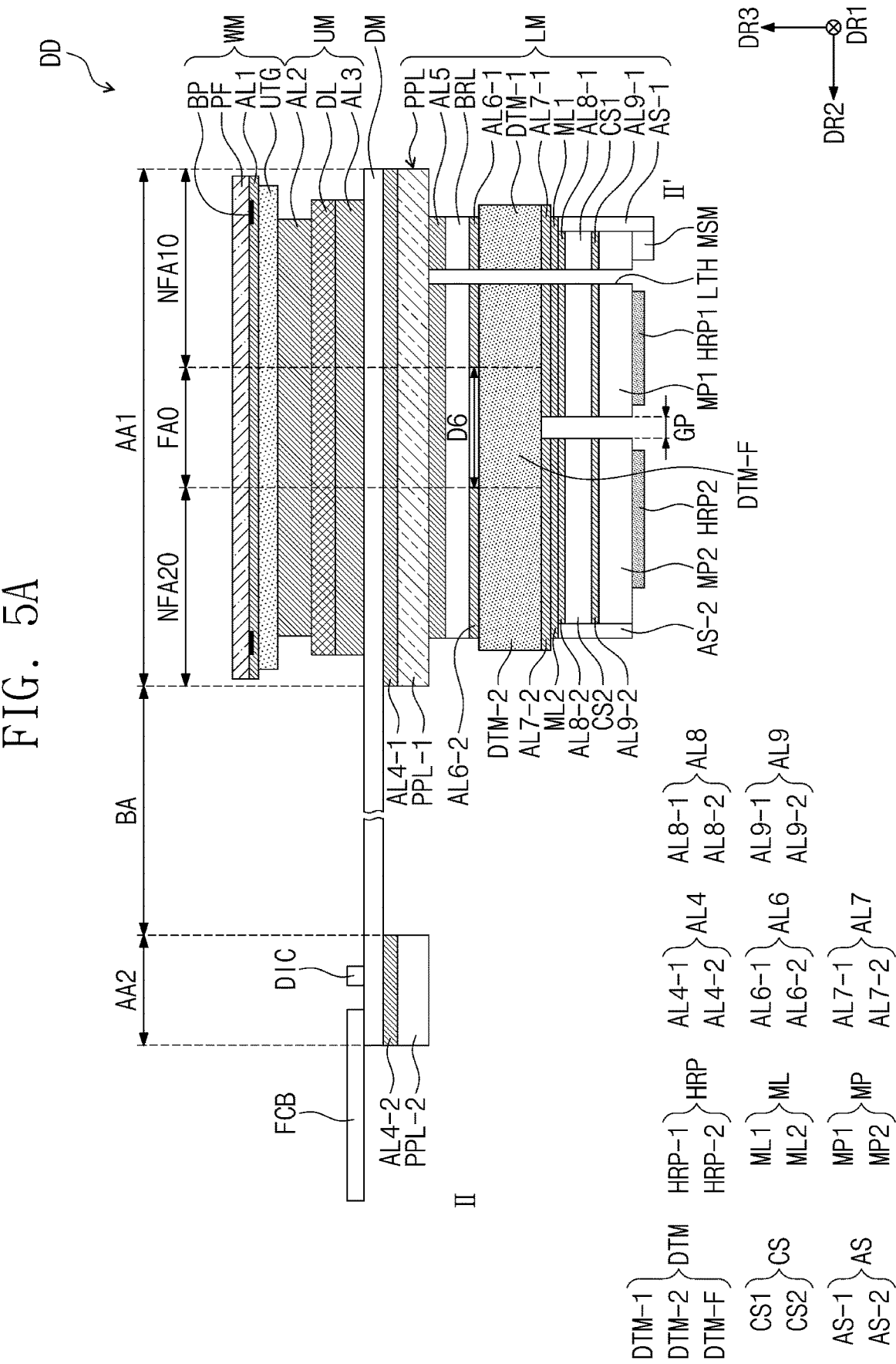
FIG. 5A is a cross-sectional view taken along line II-II' of FIG. 3A, according to an embodiment.
Figure 5B:
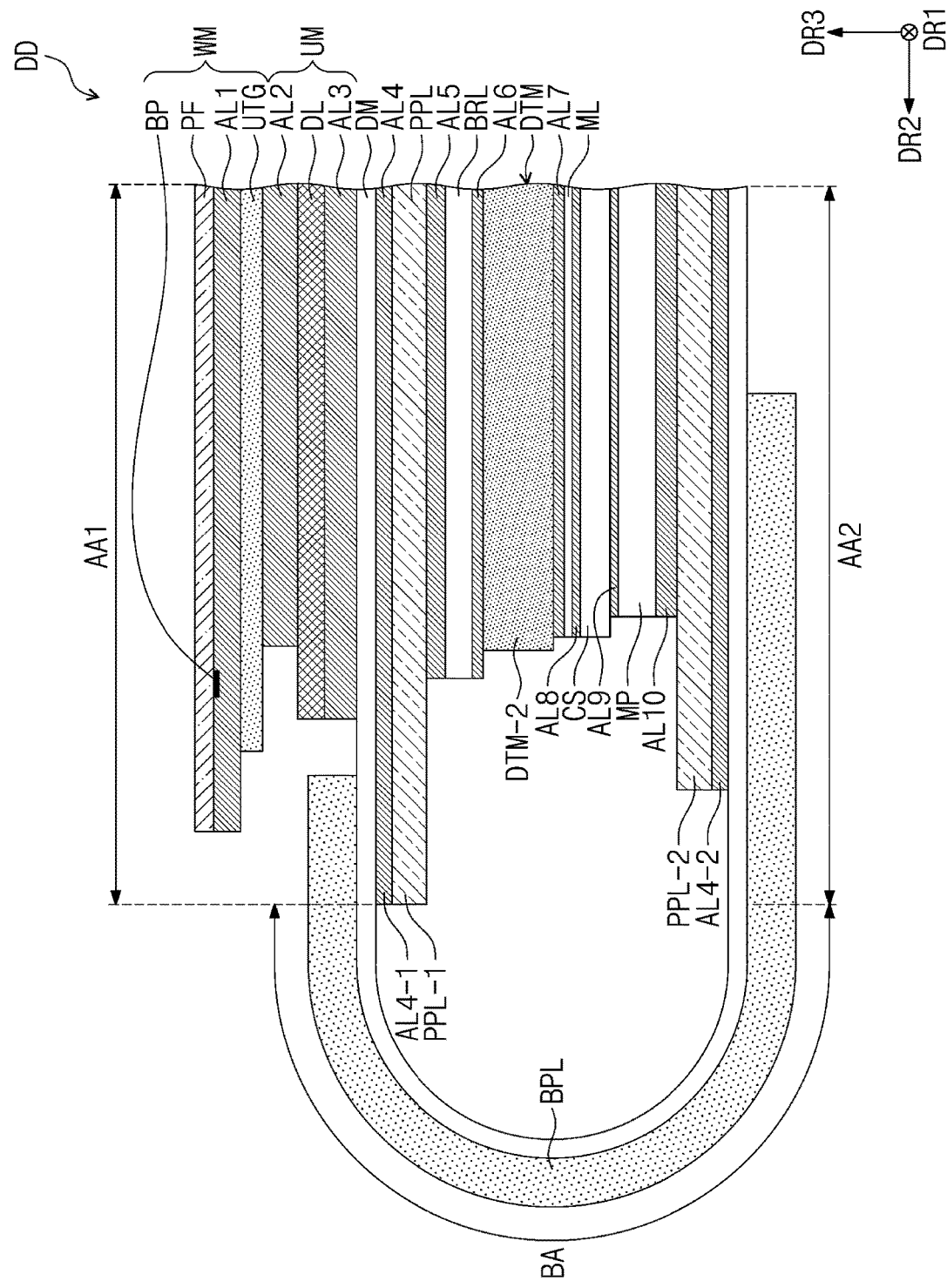
FIG. 5B is a cross-sectional view of a bent display device, according to an embodiment.

FIG. 5A is a cross-sectional view taken along line II-II' of FIG. 3A, according to an embodiment. FIG. 5B is a cross-sectional view of a bent display device according to an embodiment.

In an embodiment and referring to FIGS. 5A and 5B, the display device DD includes a window WM, an upper member UM, a display module DM, and a lower member LM. The upper member UM collectively refers to components disposed between the window WM and the display module DM, and the lower member LM collectively refers to components disposed under the display module DM.

In an embodiment, the window WM may include a thin-film glass substrate UTG, a window protection layer PF disposed on the thin-film glass substrate UTG, and a bezel pattern BP disposed on a lower surface of the window protection layer PF. In this embodiment, the window protection layer PF may include a synthetic resin film.

In an embodiment, the bezel pattern BP may be disposed on a surface of the thin-film glass substrate UTG or a surface of the window protection layer PF. FIG. 5A exemplarily illustrates the bezel pattern BP disposed on the lower surface of the window protection layer PF. However, the invention is not limited thereto, and the bezel pattern BP may also be disposed on an upper surface of the window protection layer PF. The bezel pattern BP that is a colored light-blocking film may be formed through, for example, coating. The bezel pattern BP may include a base material and a dye or pigment mixed in the base material. The non-display region NDA illustrated in FIG. 1A may be defined according to the shape of the bezel pattern BP.

In an embodiment, the thin-film glass substrate UTG may have a thickness of about 15 µm to about 45 µm. The thin-film glass substrate UTG may be made of chemically tempered glass. The thin-film glass substrate UTG may minimize occurrence of wrinkles even when folding and unfolding operations are repeated.

In an embodiment, the window protection layer PF may have a thickness of about 50 µm to about 80 µm. A synthetic resin film of the window protection layer PF may include polyimide, polycarbonate, polyamide, tri-acetyl-cellulose, or polymethylmethacrylate, and/or polyethylene terephthalate. Although not separately illustrated in the drawing, at least one of a hard-coating layer, an anti-fingerprint layer, or an anti-reflection layer may be disposed on the upper surface of the window protection layer PF.

In an embodiment, the window protection layer PF and the thin-film glass substrate UTG may be bonded to each other by a first adhesive layer AL1. The first adhesive layer AL1 may be a pressure sensitive adhesive film (PSA) or an optically clear adhesive (OCA). Adhesive layers to be described below may also include the same adhesive as the first adhesive layer AL1.

In an embodiment, the first adhesive layer AL1 may be detachable from the thin-film glass substrate UTG. That is, the adhesiveness between the first adhesive layer AL1 and the thin-film glass substrate UTG may be weaker than the adhesiveness between the first adhesive layer AL1 and the window protection layer PF. Since the window protection layer PF is disposed above the thin-film glass substrate UTG, scratches may occur relatively easily. After the first adhesive layer AL1 is detached from the window protection layer PF, a new window protection layer PF may be bonded to the thin-film glass substrate UTG.

In an embodiment and on a plane, an edge of the thin-film glass substrate UTG may not overlap the bezel pattern BP. As satisfying the aforementioned condition, the edge of the thin-film glass substrate UTG may be exposed from the bezel pattern BP, and fine cracks occurred on the edge of the thin-film glass substrate UTG may be examined through an inspection device.

In an embodiment, the upper member UM includes an upper film DL. The upper film DL may include a synthetic resin film. The synthetic resin film may include polyimide, polycarbonate, polyamide, tri-acetyl-cellulose, and/or polymethylmethacrylate, and/or polyethylene terephthalate.

In an embodiment, the upper film DL may absorb external impact applied to a front surface of the display device DD. The display module DM described with reference to FIG. 4 may include the anti-reflection layer ARL replacing a polarizing film, and accordingly, the strength of impact on the front surface of the display device DD may be reduced. The upper film DL may compensate for the impact strength reduced by applying the anti-reflection layer ARL. According to an embodiment, the upper film DL may be omitted. The thin-film glass substrate UTG and the upper film DL may be bonded to each other by a second adhesive layer AL2. The upper film DL and the display module DM may be bonded to each other by a third adhesive layer AL3.

In an embodiment, the lower member LM may include a panel protection layer PPL, a barrier layer BRL, a digitizer DTM, a metal layer ML, a cushion layer CS, a metal plate MP, a heat dissipation layer HRP, a magnetic field-shielding sheet MSM, and a step compensation member AS. The components of the upper member LM except for the digitizer DTM may be defined as functional layers.

In an embodiment, the panel protection layer PPL may be disposed under the display module DM. The panel protection layer PPL may protect a lower part of the display module DM. The panel protection layer PPL may include a flexible synthetic resin film. For example, the panel protection layer PPL may include polyethylene terephthalate.

In an embodiment, the panel protection layer PPL may not be disposed in a bending region BA. The panel protection layer PPL may include a first panel protection layer PPL-1 for protecting a first non-bending region AA1 of the display panel DP (see FIG. 3A) and a second panel protection layer PPL-2 for protecting a second non-bending region AA2.

In an embodiment, a fourth adhesive layer AL4 bonds the panel protection layer PPL to the display module DM. The fourth adhesive layer AL4 may include a first part AL4-1 corresponding to the first panel protection layer PPL-1 and a second part AL4-2 corresponding to the second panel protection layer PPL-2.

In an embodiment and as illustrated in FIG. 5B, when the bending region BA is bent, the second panel protection layer PPL-2 may be disposed, together with the second non-bending region AA2, under the first non-bending region AA1 and the first panel protection layer PPL-1. Since the panel protection layer PPL is not disposed in the bending region BA, the bending region BA may be more easily bendable. The second panel protection layer PPL-2 may be bonded to the metal plate MP through a tenth adhesive layer AL10. The tenth adhesive layer AL10 may also be omitted. Although not separately illustrated in the drawing, an additional component such as an insulating tape may be further disposed between the second panel protection layer PPL-2 and the metal plate MP.

In an embodiment and as illustrated in FIG. 5B, the bending region BA has a predetermined curvature and a predetermined radius of curvature. The radius of curvature may be about 0.1 mm to about 0.5 mm. A bending protection layer BPL is disposed at least in the bending region BA. The bending protection layer BPL may overlap the bending region BA, the first non-bending region AA1, and the second non-bending region AA2. The bending protection layer BPL may be disposed in the entire bending region BA, in a portion of the first non-bending region AA1, and in a portion of the second non-bending region AA2.

In an embodiment, the bending protection layer BPL may be bent together with the bending region BA. The bending protection layer BPL protects the bending region BA from external impact, and controls a neutral surface of the bending region BA. The bending protection layer BPL controls stresses of the bending region BA, so that the neutral surface becomes close to signal lines disposed in the bending region BA.

In an embodiment and referring to FIG. 5A again, the barrier layer BRL may be disposed under the panel protection layer PPL. The barrier layer BRL and the panel protection layer PPL may be bonded to each other by a fifth adhesive layer AL5.

In an embodiment, the barrier layer BRL may increase resistance to compressive force caused by external pressure. Therefore, the barrier layer BRL may serve to prevent deformation of the display panel DP. The barrier layer BRL may include a flexible plastic material such as polyimide and/or polyethylene terephthalate. In addition, the barrier layer BRL may be a colored film having a low light transmittance. The barrier layer BRL may absorb light incident from the outside. For example, the barrier layer BRL may be a black synthetic resin film. When the display device DD is viewed from the upper side of the window protection layer PF, components disposed under the barrier layer BRL may be invisible to a user.

In an embodiment, a sixth adhesive layer AL6 bonds the barrier layer BRL to the digitizer DTM. The sixth adhesive layer AL6 may include a first part AL6-1 and a second part AL6-2 spaced apart from each other. A distance D6 (or space) between the first part AL6-1 and the second part AL6-2 corresponds to the width of a folding region FA0, and is larger than a gap GP to be described later. The distance D6 between the first part AL6-1 and the second part AL6-2 may be about 5 mm to about 15 mm.

In an embodiment, the first part AL6-1 and the second part AL6-2 are defined as different parts of a single adhesive layer, but the invention is not limited thereto. When the first part AL6-1 is defined as a single adhesive layer (for example, first adhesive layer or second adhesive layer), the second part AL6-2 may also be defined as another single adhesive layer (for example, second adhesive layer or third adhesive layer). The aforementioned definition may be applied not only to the sixth adhesive layer AL6, but also to adhesive layers having two parts among adhesive layers to be described later.

The digitizer DTM according to an embodiment may detect an input by an electromagnetic pen. At this time, the digitizer DTM may detect the input by the electromagnetic pen in a way using electromagnetic resonance (EMR).

In an embodiment, the digitizer DTM may include a first non-folding part overlapping a first non-folding region NFA10, a folding part overlapping a folding region FA0, and a second non-folding part overlapping a second non-folding region NFA20. This will be described later.

The digitizer DTM according to an embodiment may include an elastic material at a portion overlapping the folding region FA0, and thus additional holes for facilitating folding operations may not be defined therein. In addition, the digitizer DTM may have a structure in which a metal plate, etc., disposed between the digitizer DTM and the display panel DP and having holes defined in a region overlapping the folding region FA0, is omitted. Description of this will be made later.

In an embodiment, the metal layer ML may be disposed under the digitizer DTM. The metal layer ML may include a first metal layer ML1 and a second metal layer ML2 respectively overlapping the first non-folding part DTM-1 and the second non-folding part DTM-2. The first metal layer ML1 and the second metal layer ML2 may each overlap a portion of the folding part DTM-F, and may be spaced apart from each other in a region overlapping the folding part DTM-F.

In an embodiment, the metal layer ML may dissipate heat, generated during operation of the digitizer DTM, to the outside. The metal layer ML transfers heat, generated in the digitizer DTM, downward. The metal layer ML may have higher electrical conductivity and heat conductivity than the metal plate MP to be described later. The metal layer ML may include copper and/or aluminum. The metal layer ML, with relatively high electrical conductivity, may prevent an electromagnetic wave, generated from the electronic module EM (see FIG. 2A) disposed thereunder, as a noise from affecting the digitizer DTM.

In an embodiment, a seventh adhesive layer AL7 may bond the digitizer DTM to the metal layer ML. The seventh adhesive layer AL7 may include a first part AL7-1 and a second part AL7-2 corresponding to the first metal layer ML1 and the second metal layer ML2, respectively.

In an embodiment, the cushion layer CS may include a first cushion layer CS1 and a second cushion layer CS2 respectively overlapping the first non-folding part DTM-1 and the second non-folding part DTM-2. The first cushion layer CS1 and the second cushion layer CS2 may each overlap a portion of the folding part DTM-F, and may be spaced apart from each other in a region overlapping the folding part DTM-F.

In an embodiment, the first cushion layer CS1 and the second cushion layer CS2 may prevent foreign substances from entering folding part DTM-F when the display device DD is folded. In addition, when the display device DD is unfolded, even though the folding part DTM-F is folded with a predetermined curvature, the shape of the digitizer DTM may be easily changed as the first cushion layer CS1 and the second cushion layer CS2 are spaced apart from each other in a region overlapping the folding part DTM-F.

In an embodiment, the cushion layer CS may be disposed under the metal layer ML. The cushion layer CS may protect the display module DM from impact transmitted from a lower part of the display module DM. The cushion layer CS may include foam and/or sponge. The foam may include polyurethane foam and/or thermoplastic polyurethane foam. When the cushion layer CS includes the foam, a barrier film may be added to the cushion layer CS as a base layer, and the cushion layer CS may be formed by applying a foaming agent onto the barrier film.

In an embodiment, an eighth adhesive layer AL8 may bond the metal layer ML to the cushion layer CS. The eighth adhesive layer AL8 may include a first part AL8-1 and a second part AL8-2 respectively corresponding to the first cushion layer CS1 and the second cushion layer CS2.

In an embodiment, the metal plate MP may be disposed under the cushion layer CS. The metal plate MP may include a first metal plate MP1 and a second metal plate MP2 respectively overlapping the first cushion layer CS1 and the second cushion layer CS2. The metal plate MP may absorb external impact applied from a lower side thereof. The metal plate MP may be greater in strength and thickness than the metal layer ML. The metal plate MP may include a metal material such as stainless steel.

In an embodiment, a nineth adhesive layer AL9 may bond the cushion layer CS to the metal plate MP. The nineth adhesive layer AL9 may include a first part AL9-1 and a second part AL9-2 respectively corresponding to the first metal plate MP1 and the second metal plate MP2.

In an embodiment, the heat dissipation layer HRP may be disposed under the metal plate MP. The heat dissipation layer HRP may include a first heat dissipation layer HRP1 and a second heat dissipation layer HRP2 respectively overlapping the first metal plate MP1 and the second metal plate MP2. The heat dissipation layer HRP dissipates heat generated from electronic components disposed thereunder. The electronic components may be the electronic module EM illustrated in FIGS. 2A and 2B. The heat dissipation layer HRP may have a structure in which an adhesive layer and a graphite layer are alternately stacked. The heat dissipation layer HRP may be bonded to the metal plate MP through an additional adhesive layer disposed between the heat dissipation layer HRP and the metal plate MP.

In an embodiment, the magnetic field-shielding sheet MSM is disposed under the metal plate MP. The magnetic field-shielding sheet MSM shields a magnetic field generated from a magnetic substance (not shown) disposed thereunder. The magnetic field-shielding sheet MSM may prevent the magnetic field generated from the magnetic substance from interfering with the digitizer DTM.

In an embodiment, the magnetic field-shielding sheet MSM includes a plurality of parts. At least some of the plurality of parts may have different thicknesses. The plurality of parts may be disposed in accordance with a step difference of a bracket (not shown) disposed under the display device DD. The magnetic field-shielding sheet MSM may have a structure in which a magnetic field-shielding layer and an adhesive layer are alternately stacked. A portion of the magnetic field-shielding sheet MSM may be directly bonded to the metal plate MP.

In an embodiment, the step compensation member AS may be bonded to the lower side of the seventh adhesive layer AL7. The step compensation member AS may be a double-sided tape or an insulation film. The step compensation member AS may be provided as a first step compensation member AS-1 and a second step compensation member AS-2, and may compensate for steps formed in different widths between components included in the lower member LM.

In an embodiment, the functional layers, of the lower member LM, disposed under the first non-folding part DTM-1 and the second non-folding part DTM-2 are disposed apart from each other in a region overlapping the folding part DTM-F with a predetermined gap GP therebetween. The gap GP may be about 0.3 mm to about 3 mm.

In an embodiment, a through-hole LTH may be formed in some members of the lower member LM. The through-hole LTH is disposed overlapping the sensing region DP-TA in FIG. 2A. As illustrated in FIG. 5A, the through-hole LTH may pass through from the fifth adhesive layer AL5 to the metal plate MP. The through-hole LTH is like having a light-blocking structure removed from a path of optical signal, and the through-hole LTH may improve efficiency of optical signal reception of an electronic optical module ELM.

In an embodiment, at least one of the metal layer ML, the cushion layer CS, the metal plate MP, or the step compensation member AS may be omitted in the electronic apparatus ED according to an embodiment, and the configuration is not limited to any one embodiment.

Figure 6A:
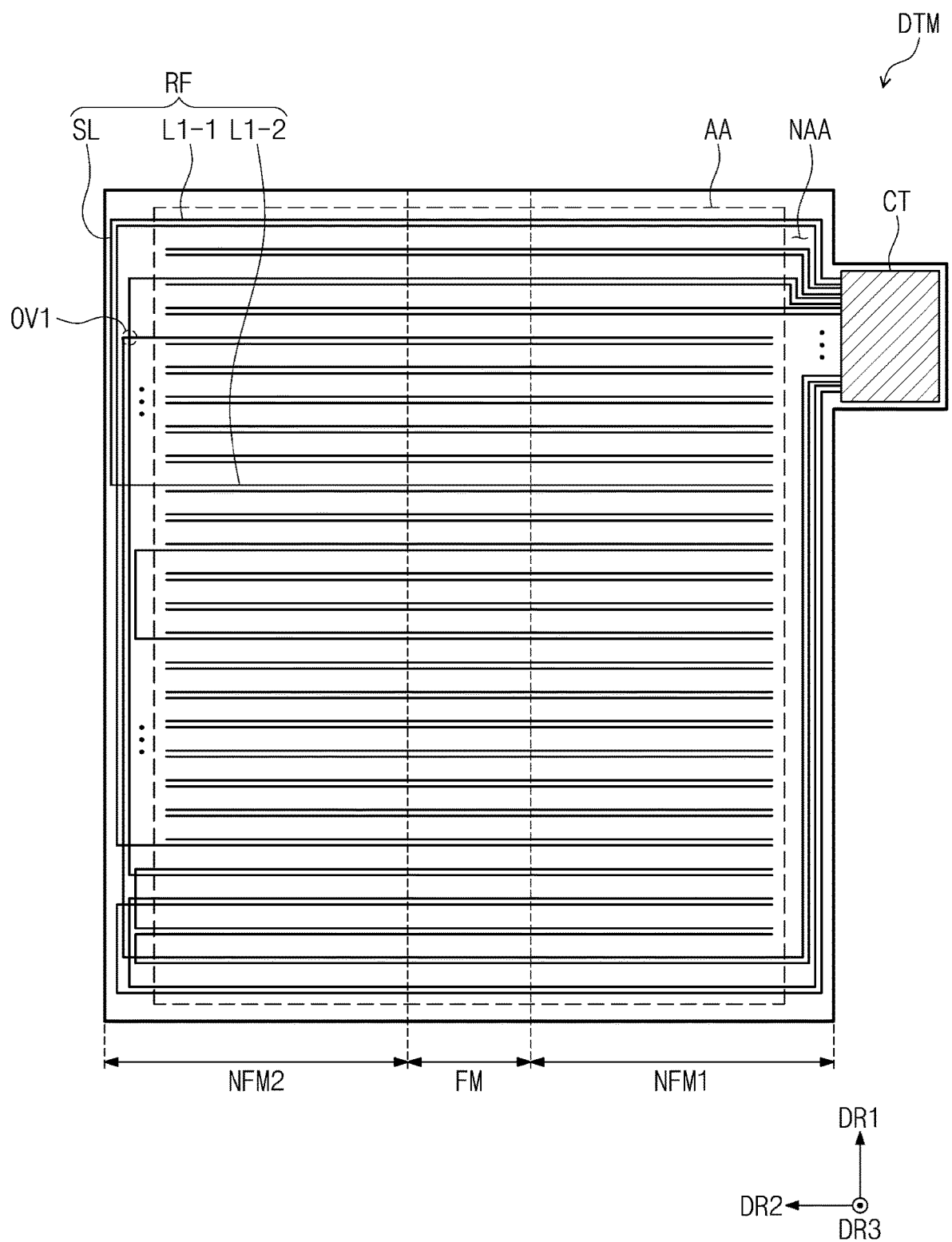
FIG. 6A is a plan view of a digitizer, according to an embodiment.
Figure 6B:
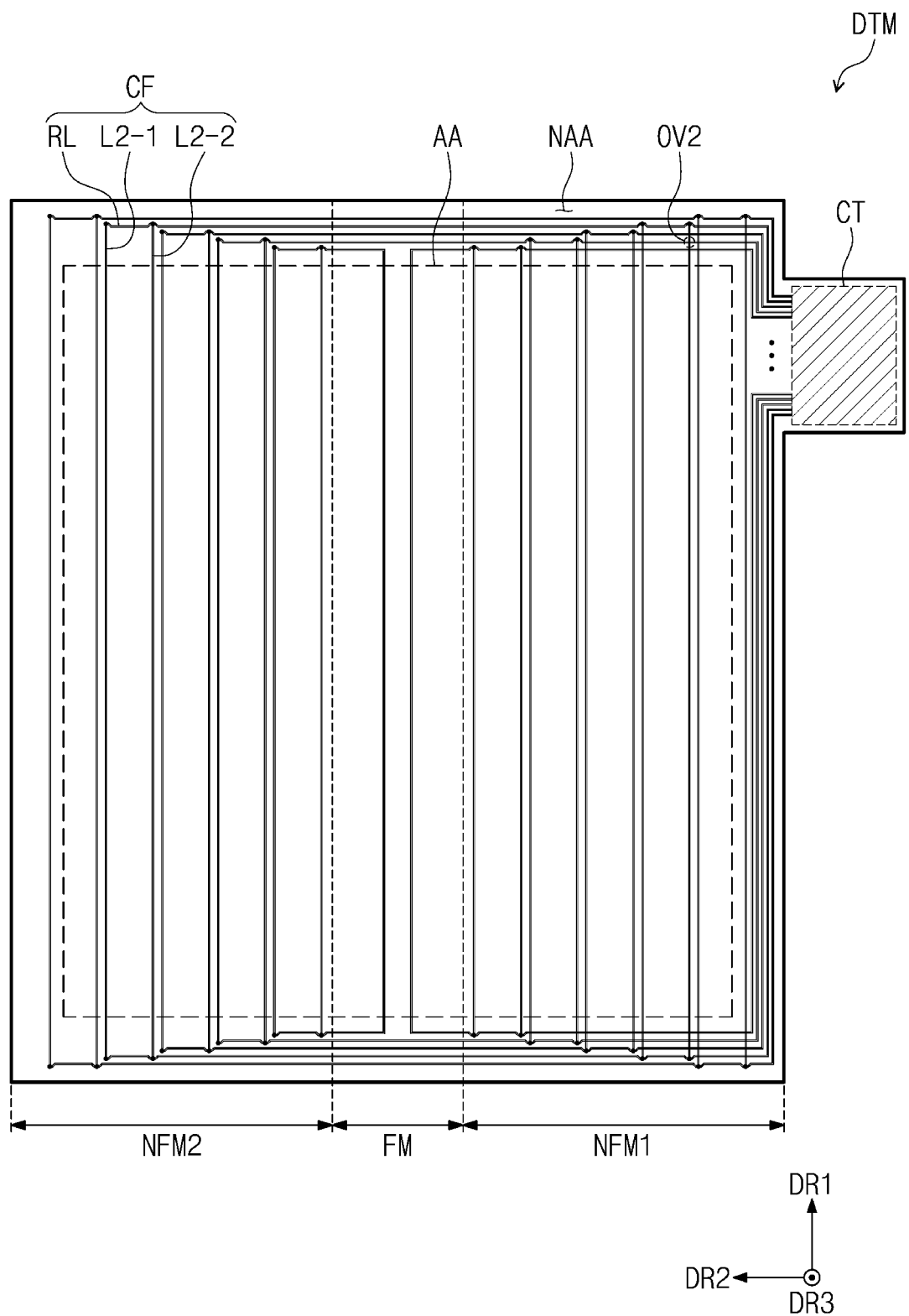
FIG. 6B is a plan view of a digitizer, according to an embodiment.

FIG. 6A is a plan view of a digitizer, according to an embodiment. FIG. 6B is a plan view of a digitizer according to an embodiment.

Referring to FIGS. 6A and 6B, a digitizer DTM according to an embodiment may include an active region AA and a peripheral region NAA. The active region AA may be defined as a region for detecting an input by a pen, and the peripheral region NAA may be a region where bridge patterns are disposed for each of sensing coils RF and CF to form a loop. The digitizer DTM may include a plurality of sensing coils RF and CF, and a connector CT. The digitizer DTM according to an embodiment may include a first non-folding part NFM1, a second non-folding part NFM2, and a folding part FM. The first non-folding part NFM1 may be defined as a portion overlapping the first non-folding region NFA10 (see FIG. 3A), the second non-folding part NFM2 may be defined as a portion overlapping the second non-folding region NFA20 (see FIG. 3A), and the folding part FM may be defined as a portion overlapping the folding region FA0 (see FIG. 3A).

In an embodiment, the first sensing coils RF may each include first and second long sides L1-1 and L1-2, respectively, extending in a second direction DR2, and first short sides SL extending in a first direction DR1 and connecting each end of the first and second long sides L1-1 and L1-2, respectively, that are spaced apart from each other along the first direction DR1.

In an embodiment, the lengths of the first short sides SL may differ from each other in the first direction DR1. Accordingly, the widths, in the second direction DR2, between the first and second long sides L1-1 and L1-2, respectively, included in each of the first sensing coils RF may differ from each other. However, the invention is not limited thereto, and the lengths of the first short sides SL may be the same in the second direction DR2, and the first sensing coils RF each forming a loop may be spaced apart from each other. One end of each of the first sensing coils RF extending to the peripheral region NAA may be connected to the connector CT.

According to an embodiment, the first sensing coils RF may each make at least two turns, and have a shape of an open loop where at least one of one end or the other end is connected to the connector CT. At least a portion of coils, among the first sensing coils RF, detecting different signals and adjacent to each other may overlap and intersect with each other. The first sensing coils RF may each form a loop and may overlap each other, so that a first intersection OV1, at which the coils intersect with each other on a plane, may be formed. At the first intersection OV1, a portion of each of the first sensing coils RF may be disposed on a different layer, and connected to each other through a contact hole defined in at least one insulation layer. FIG. 6A exemplarily illustrates one first intersection OV1, but the above description may be equally applied to all intersections of the first sensing coils RF.

In an embodiment, the second sensing coils CF may each include third and fourth long sides L2-1 and L2-2, respectively, extending in the first direction DR1, and second short sides RL extending in the second direction DR2 and connecting each end of the third and fourth long sides L2-1 and L2-2, respectively, that are spaced apart from each other along the first direction DR1. One end of each of the second sensing coils CF extending to the peripheral region NAA may be connected to the connector CT. A separate flexible circuit board may be connected to the connector CT, and thus be connected to a main circuit board.

According to an embodiment, the second sensing coils CF may each make at least two turns, and have a shape of an open loop where at least one of one end or the other end is connected to the connector CT. At least a portion of coils, among the second sensing coils CF, detecting different signals and adjacent to each other may overlap and intersect with each other. The second sensing coils CF may each form a loop and may overlap each other, so that a second intersection OV2, at which the coils intersect with each other on a plane, may be formed. At the second intersection OV2, a portion of each of the second sensing coils CF may be disposed on a different layer, and connected to each other through a contact hole defined in at least one insulation layer. FIG. 6B exemplarily illustrates one second intersection OV2, but the above description may be equally applied to all intersections of the second sensing coils CF.

In an embodiment, the second sensing coils CF may be referred to as driving coils, and the first sensing coils RF may be referred to as sensing coils. However, the invention is not limited thereto, and may be vice versa. When current flows through the second sensing coils CF, a magnetic force line may be induced between the second sensing coils CF and the first sensing coils RF. The first sensing coils RF may detect an induced electromagnetic force emitted from an electromagnetic pen, and as a sensing signal, output to one terminal of each of the first sensing coils RF. One end of each of the first sensing coils RF may be connected to signal lines disposed in the peripheral region NAA.

According to an embodiment, a separate hole/groove passing through the digitizer DTM is not formed in the folding part FM of the digitizer DTM, and thus the sensing coils RF and CF may be disposed on a flat surface of the digitizer DTM in an unfolded state. For example, coils, among the first sensing coils RF, disposed in the folding part FM may each extend along the second direction DR2, and coils, among the second sensing coils CF, disposed in the folding part FM may each extend along the first direction DR1.

Therefore, in an embodiment, it may not be needed to change the shapes of the coils disposed in the folding part FM in order to cross between the holes/grooves of the folding part FM, and it may be possible to design such that the line widths of the coils disposed in the non-folding parts NFM1 and NFM2 and the line widths of the coils disposed in the folding part FM are equal to each other. For example, the line widths of the coils disposed in the non-folding parts NFM1 and NFM2 and the line widths of the coils disposed in the folding part FM may each be about 100 μm to about 400 μm.

According to an embodiment, since it is designed such that the line widths of the coils disposed in the non-folding parts NFM1 and NFM2 and the line widths of the coils disposed in the folding part FM are equal to each other, resistance of the coils disposed in the folding part FM may be reduced, thereby providing the digitizer DTM with improved linearity of the coils.

Figure 7:
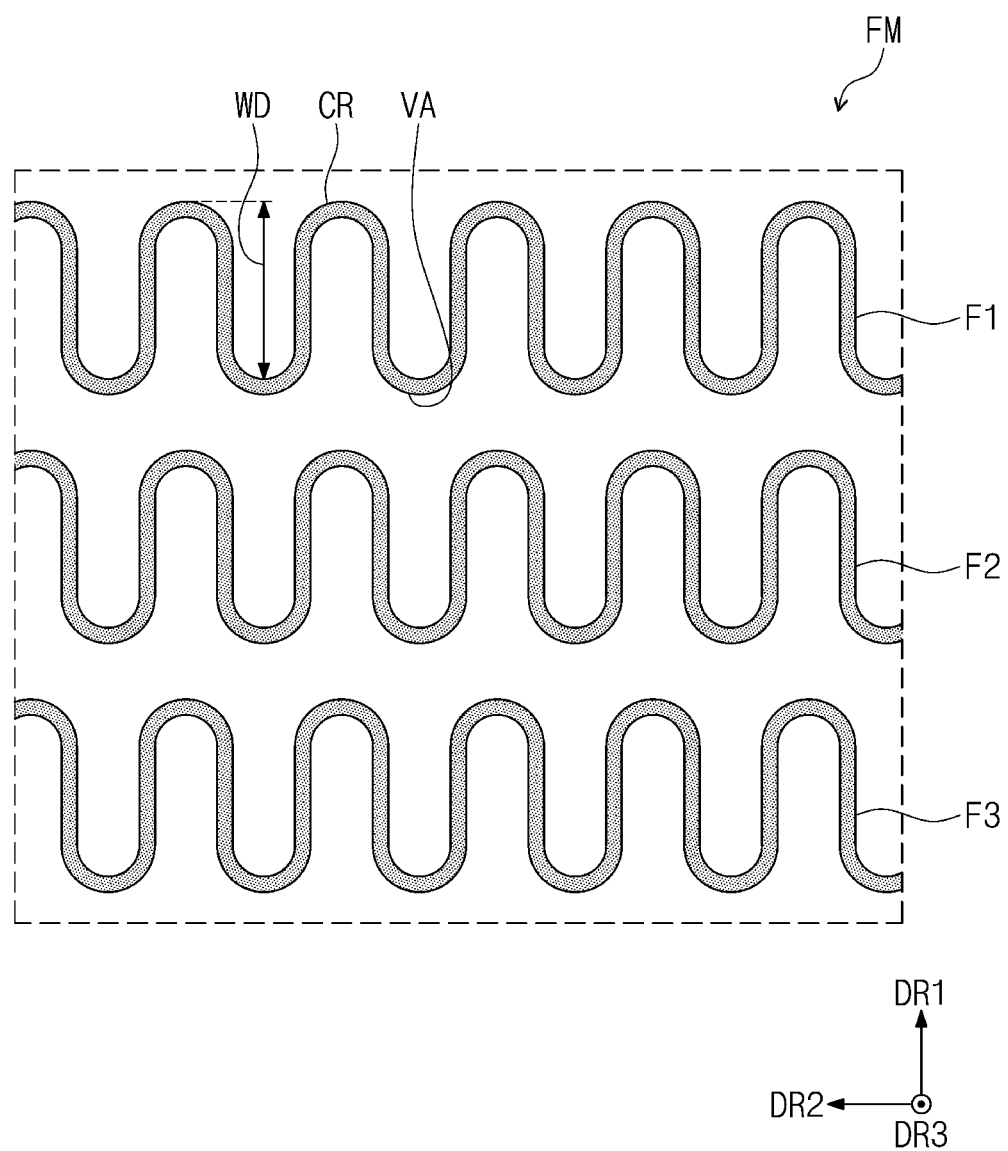
FIG. 7 is an enlarged plan view illustrating a region of a digitizer, according to an embodiment.

FIG. 7 is an enlarged plan view illustrating a region of a digitizer according to an embodiment. FIG. 7 exemplarily illustrates three coils among coils disposed in a folding part FM.

Referring to FIG. 7, folding coils F1, F2, and F3, among the first sensing coils RF (see FIG. 6A) according to an embodiment, disposed in the folding part FM may have a different shape from coils disposed in the non-folding parts NFM1 and NFM2 (see FIG. 6A).

For example, in an embodiment, the folding coils F1, F2, and F3 may each have a shape in a staggered manner, a shape of wave, or the like in which valleys VA and crests CR are repeated. A portion defining the valley VA and the crest CR of each of the folding coils F1, F2, and F3 may have a curve, and a portion connecting one end of each of the curves may have a straight line.

According to an embodiment, since each of the folding coils F1, F2, and F3 has a shape in which the valleys VA and the crests CR are repeated, during the folding operation, the folding coils F1, F2, and F3 may be more easily deformed along a second direction DR2 than the coils disposed in the non-folding parts NFM1 and NFM2 (see FIG. 6A). That is, during the folding operation such as what is illustrated in FIG. 1C, as the folding part FM is stretched, the folding coils F1, F2, and F3 may be correspondingly relaxed. Therefore, it may be possible to provide the digitizer DTM (see FIG. 6A) that facilitates folding operations.

Figure 8:
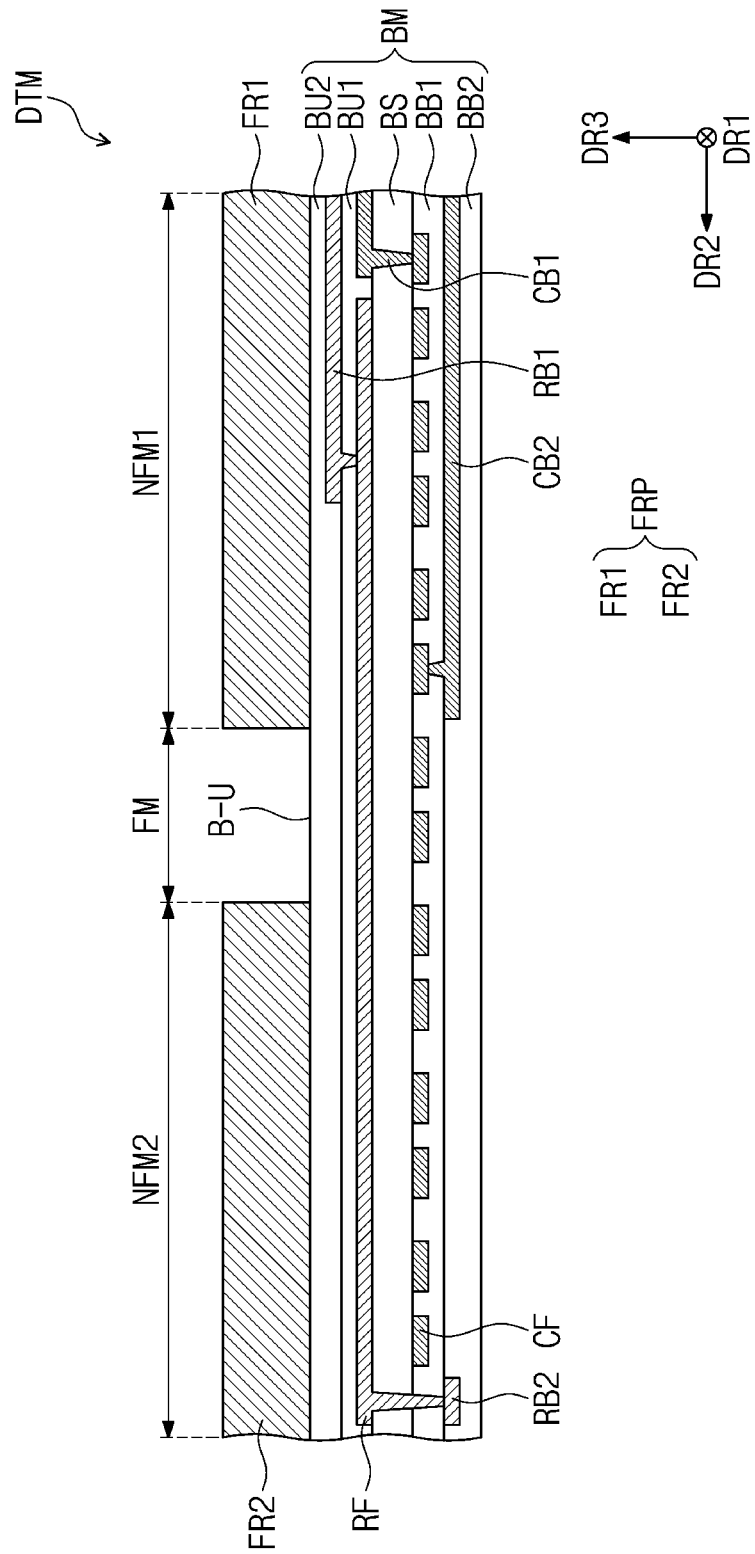
FIG. 8 is a cross-sectional view of a digitizer, according to an embodiment.

FIG. 8 is a cross-sectional view of a digitizer according to an embodiment.

Referring to FIG. 8, the digitizer DTM according to an embodiment may include a base part BM on which sensing coils RF and CF are disposed, and a reinforcement part FRP (upper reinforcement part).

In an embodiment, the base part BM may include a middle layer BS, a first upper base layer BU1, a second upper base layer BU2, a first lower base layer BB1, and a second lower base layer BB2. The first upper base layer BU1 and the second upper base layer BU2 may be defined as an upper base layer, and the first lower base layer BB1 and the second lower base layer BB2 may be defined as a lower base layer.

In an embodiment, a first sensing coil RF may be disposed on an upper surface of the middle layer BS. The first sensing coil RF may correspond to any one of the first sensing coils RF described with reference to FIG. 6A.

In an embodiment, the first upper base layer BU1 may be disposed on the middle layer BS, and may thus cover the first sensing coil RF. The second upper base layer BU2 may be disposed on the first upper base layer BU1.

In an embodiment, the first lower base layer BB1 may be disposed under the middle layer BS, and may thus cover second sensing coils CF. The second lower base layer BB2 may be disposed under the first lower base layer BB1.

The digitizer DTM according to an embodiment may further include a (1-1)-th bridge pattern RB1 disposed between the first upper base layer BU1 and the second upper base layer BU2 and connected to the first sensing coil RF through a contact hole passing through the first upper base layer BU1.

In addition, in an embodiment, the digitizer DTM may further include a (1-2)-th bridge pattern RB2 disposed between the first lower base layer BB1 and the second lower base layer BB2 and connected to the first sensing coil RF through a contact hole passing through the first lower base layer BB1 and the middle layer BS.

In an embodiment, connection relations between the first sensing coil RF and the (1-1)-th bridge pattern RB1, and between the first sensing coil RF and the (1-2)-th bridge pattern RB2 may correspond to the embodiment of the connection relation between the coils at the first intersection OV1 described with reference to FIG. 6A. Therefore, either of the (1-1)-th bridge pattern RB1 or the (1-2)-th bridge pattern RB2 may be omitted.

The digitizer DTM according to an embodiment may further include a (2-1)-th bridge pattern CB1 disposed between the middle layer BS and the first upper base layer BU1, and connected to the second sensing coils CF through a contact hole passing through the middle layer BS. In addition, the digitizer DTM may further include a (2-2)-th bridge pattern CB2 disposed between the first lower base layer BB1 and the second lower base layer BB2, and connected to any one of the second sensing coils CF through a contact hole passing through the first upper base layer BU1.

In an embodiment, connection relations between the second sensing coil CF and the (2-1)-th bridge pattern CB1, and between the second sensing coil CF and the (2-2)-th bridge pattern CB2 may correspond to the embodiment of the connection relation of the coils at the second intersection OV2 described with reference to FIG. 6B. Therefore, either of the (2-1)-th bridge pattern CB1 or the (2-2)-th bridge pattern CB2 may be omitted.

According to an embodiment, the middle layer BS, the first upper base layer BU1, the second upper base layer BU2, the first lower base layer BB1, and the second lower base layer BB2 included in the base part BM may each have an elastic material. The elastic material may have a tensile modulus of about 10 MPa to about 100 MPa. The yield point of the elastic material may be about 5% or more. In addition, the restoration rate of the elastic material after about 3% stretching may be about 90% or more.

In an embodiment, the elastic material may include, for example, either synthetic rubber or polydimethylsiloxane (PDMS). The synthetic rubber may be any one among styrene-butadiene rubber (SBR), butadiene rubber (BR), and butyl rubber. Hereinafter, in the drawings, an embodiment in which an 'elastic material' is included in a 'base part' includes any one of the above-described materials included in the elastic material, and the duplicate description will be omitted.

In an embodiment, the elastic material may be included throughout the entire regions of the non-folding parts NFM1 and NFM2 and the folding part FM.

According to an embodiment, since the digitizer DTM has the elastic material disposed in the folding part FM where tensile and compressive stresses are repeated, and most deformations occur, it may be possible to provide the electronic apparatus ED including the digitizer DTM with improved folding characteristics.

In an embodiment, the reinforcement part FRP may be disposed on an upper surface of the base part BM. The reinforcement part FRP may include a first reinforcement layer FR1 overlapping the first non-folding part NFM1 and a second reinforcement layer FR2 overlapping the second non-folding part NFM2. The first reinforcement layer FR1 and the second reinforcement layer FR2 may be spaced apart from each other along the second direction DR2, and may thus expose the upper surface B-U of the base part BM overlapping the folding part FM.

The reinforcement part FRP according to an embodiment may include a different material from that of the base part BM. The reinforcement part FRP may have a larger modulus than the base part BM, and may include non-ferrous metal. For example, the reinforcement part FRP may include either a reinforced fiber composite material or a ceramic-based material.

In an embodiment, the reinforced fiber composite material may include, for example, either carbon fiber-reinforced plastic (CFRP) or glass fiber-reinforced plastic (GFRP). Hereinafter, in the drawings, an embodiment in which 'non-ferrous metal' is included in a 'reinforcement part' may include the same material as the above-described material included in the reinforcement part FRP, and the duplicate description will be omitted.

Figure 9:
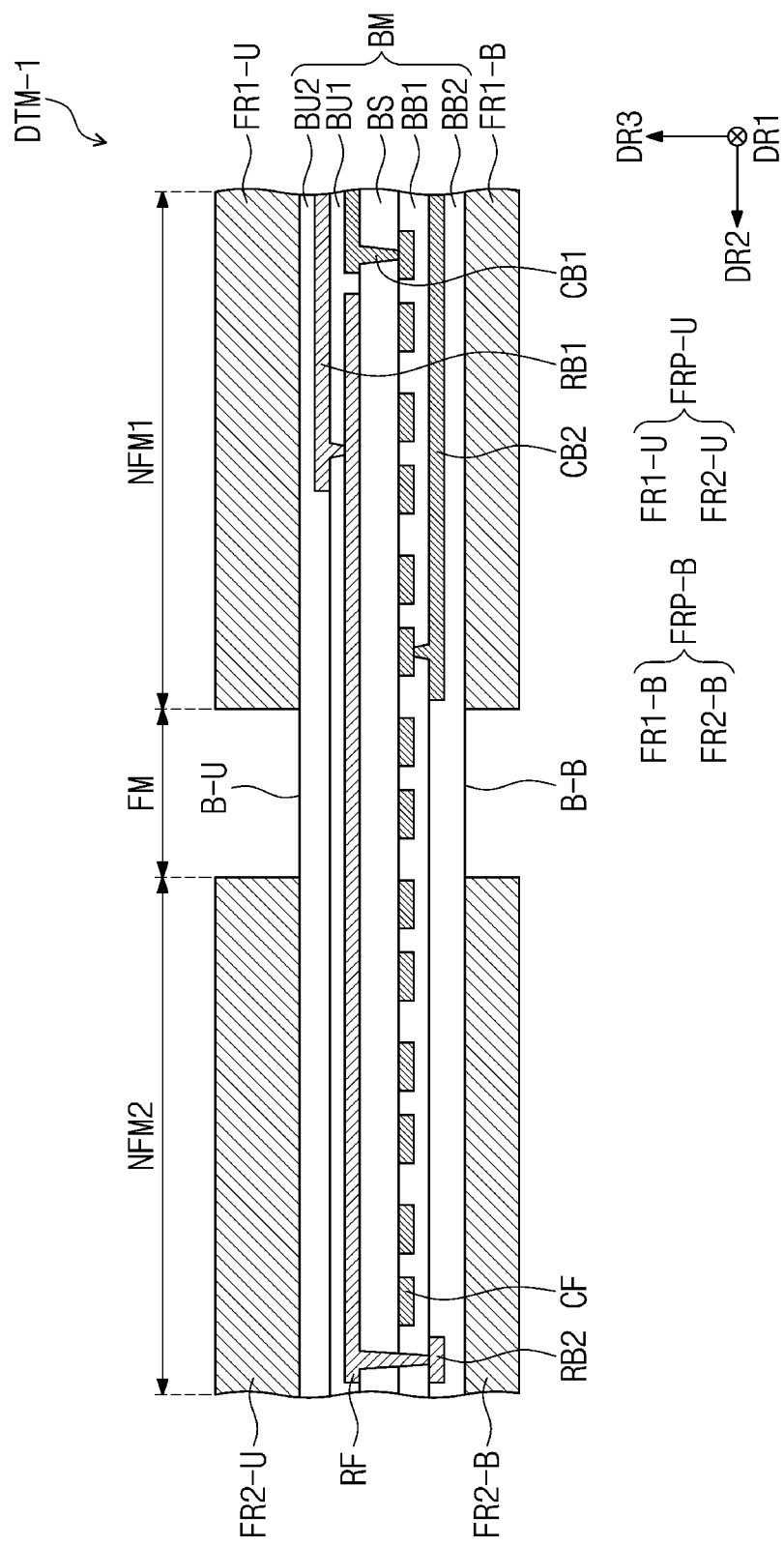
FIG. 9 is a cross-sectional view of a digitizer, according to an embodiment.
Figure 10:
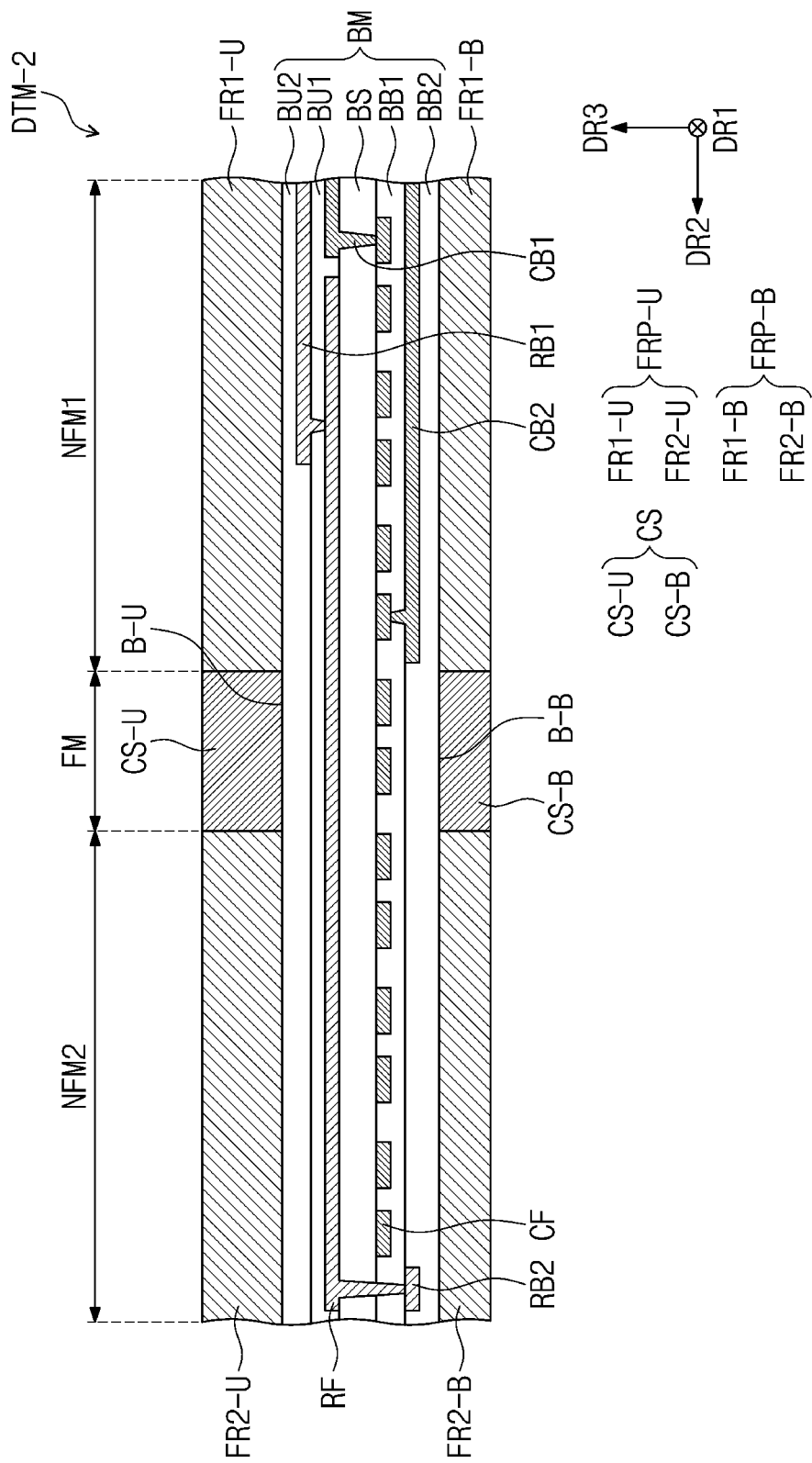
FIG. 10 is a cross-sectional view of a digitizer, according to an embodiment.
Figure 11:
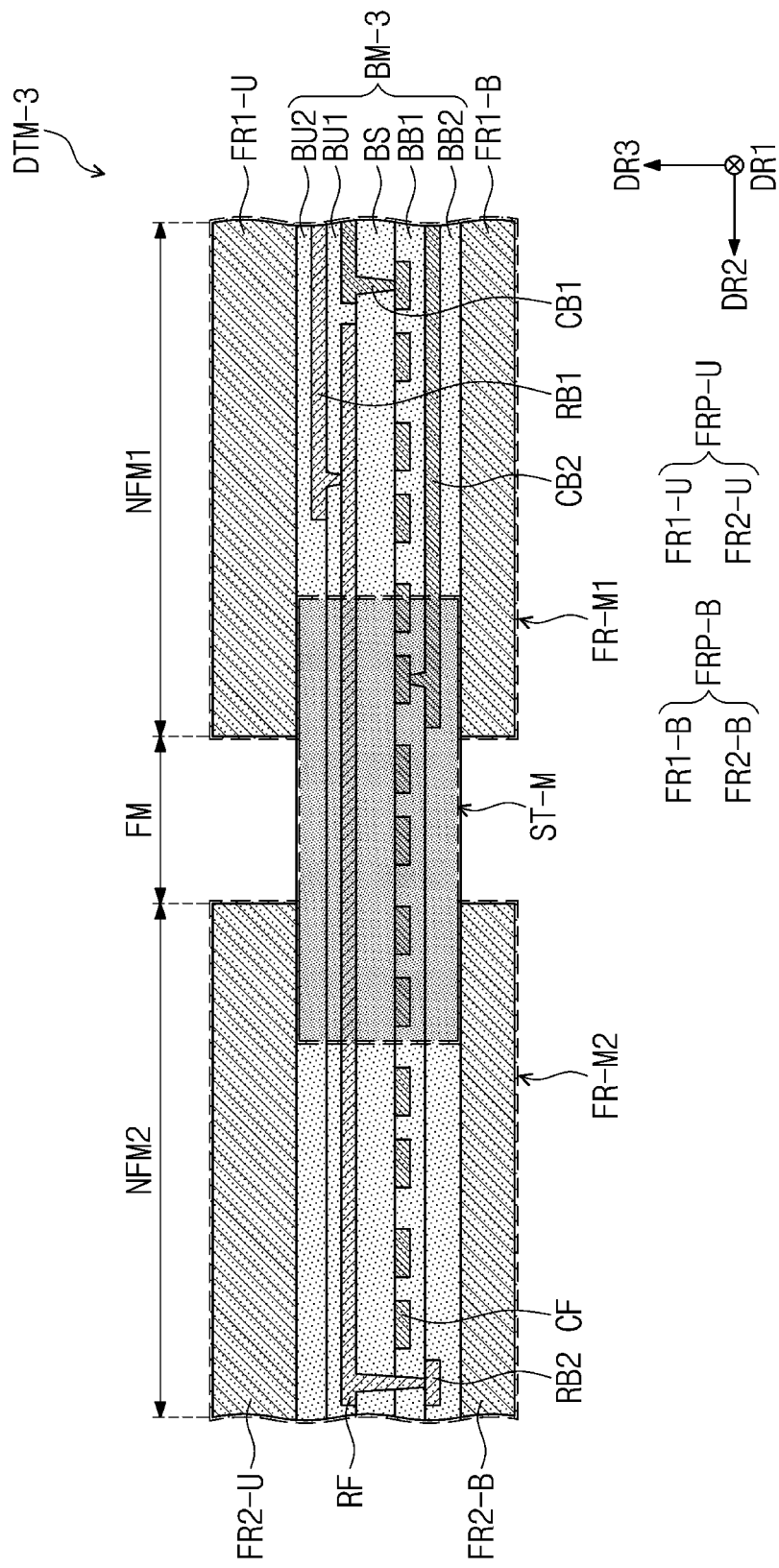
FIG. 11 is a cross-sectional view of a digitizer, according to an embodiment.
Figure 12:
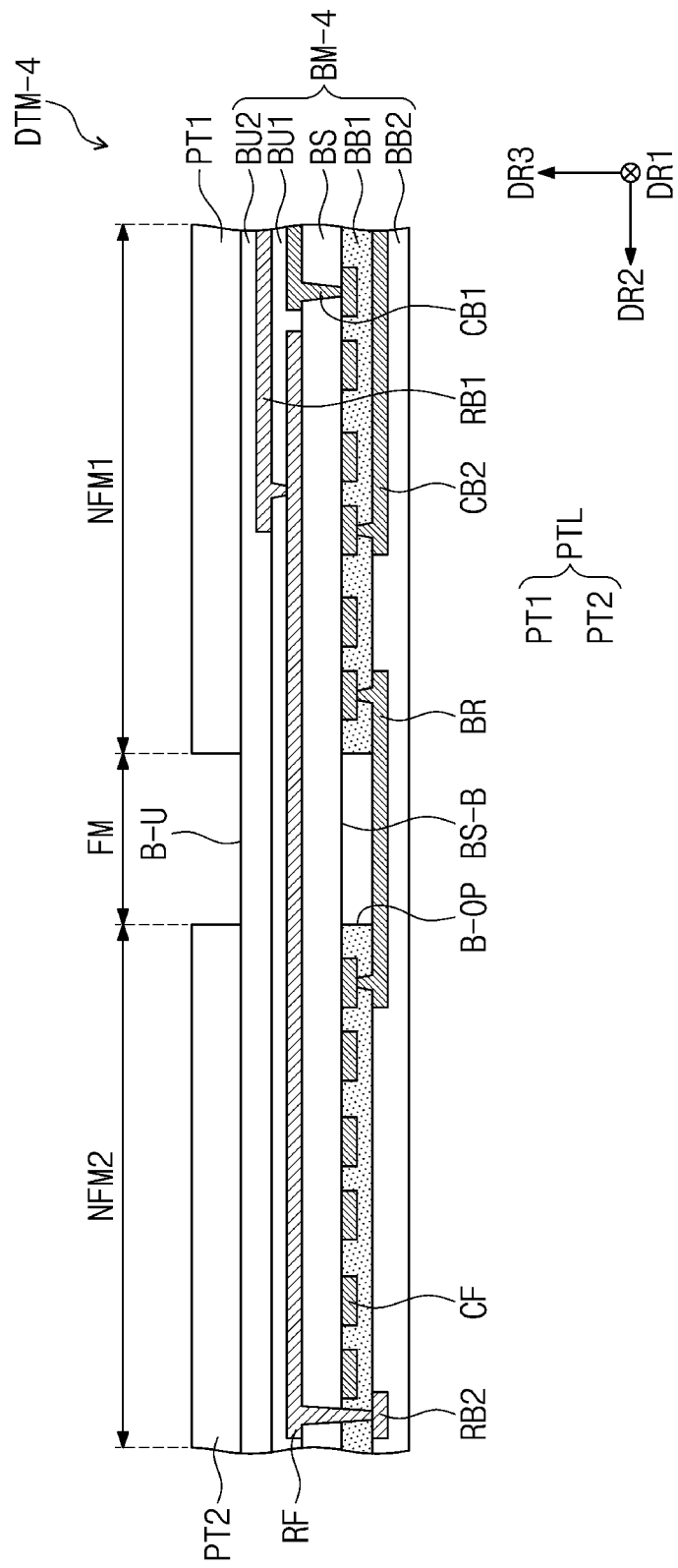
FIG. 12 is a cross-sectional view of a digitizer, according to an embodiment.

FIG. 9 is a cross-sectional view of a digitizer according to an embodiment. FIG. 10 is a cross-sectional view of a digitizer according to an embodiment. FIG. 11 is a cross-sectional view of a digitizer according to an embodiment. FIG. 12 is a cross-sectional view of a digitizer according to an embodiment. Same/similar components as the components described with reference to FIGS. 1A to 8 will be denoted as the same/similar reference numerals or symbols, and the duplicate descriptions will be omitted.

Referring to FIG. 9, a digitizer DTM-1 according to an embodiment may include a base part BM on which sensing coils RF and CF are disposed, an upper reinforcement part FRP-U, and a lower reinforcement part FRP-B.

In an embodiment, the base part BM may include a middle layer BS, a first upper base layer BU1, a second upper base layer BU2, a first lower base layer BB1, and a second lower base layer BB2.

In an embodiment, the first sensing coil RF may be disposed on an upper surface of the middle layer BS. The first upper base layer BU1 may be disposed on the middle layer BS, and may thus cover the first sensing coil RF. The second upper base layer BU2 may be disposed on the first upper base layer BU1.

In an embodiment, the first lower base layer BB1 may be disposed under the middle layer BS, and may thus cover the second sensing coils CF. The second lower base layer BB2 may be disposed under the first lower base layer BB1.

The digitizer DTM-1 according to an embodiment may further include a (1-1)-th bridge pattern RB1 and a (2-1)-th bridge pattern RB2 each of which is disposed on a different layer from the first sensing coil RF, and is connected to the first sensing coil RF through a corresponding contact hole.

The digitizer DTM-1 according to an embodiment may further include a (2-1)-th bridge pattern CB1 and a (2-2)-th bridge pattern CB2 each of which is disposed on a different layer from the second sensing coils CF, and is connected to any one of the second sensing coils CF through a corresponding contact hole.

According to an embodiment, the base part BM may include an elastic material, and the upper reinforcement part FRP-U and the lower reinforcement part FRP-B may include non-ferrous metal.

In an embodiment, the upper reinforcement part FRP-U may be disposed on an upper surface of the base part BM. The upper reinforcement part FRP-U may include a (1-1)-th reinforcement layer FR1-U overlapping a first non-folding part NFM1 and a (1-2)-th reinforcement layer FR2-U overlapping a second non-folding part NFM2. The (1-1)-th reinforcement layer FR1-U and the (1-2)-th reinforcement layer FR2-U may be spaced apart from each other along a second direction DR2, and may expose the upper surface B-U of the base part BM overlapping the folding part FM.

In an embodiment, the lower reinforcement part FRP-B may be disposed on a lower surface of the base part BM. The lower reinforcement part FRP-B may include a (2-1)-th reinforcement layer FR1-B overlapping the first non-folding part NFM1 and a (2-2)-th reinforcement layer FR2-B overlapping the second non-folding part NFM2. The (2-1)-th reinforcement layer FR1-B and the (2-2)-th reinforcement layer FR2-B may be spaced apart from each other along the second direction DR2, and may expose the lower surface B-B of the base part BM overlapping the folding part FM.

In FIG. 10, only components in addition to the components in FIG. 9 will be described. A digitizer DTM-2 according to an embodiment may further include a step compensation layer CS. The step compensation layer CS may include a first compensation layer CS-U and a second compensation layer CS-B.

In an embodiment, the first compensation layer CS-U may be disposed between a (1-1)-th reinforcement layer FR1-U and a (1-2)-th reinforcement layer FR2-U, and may thus cover an upper surface B-U of a base part BM exposed from the (1-1)-th reinforcement layer FR1-U and the (1-2)-th reinforcement layer FR2-U.

In an embodiment, the second compensation layer CS-B may be disposed between a (2-1)-th reinforcement layer FR1-B and a (2-2)-th reinforcement layer FR2-B, and may thus cover a lower surface B-B of the base part BM exposed from the (2-1)-th reinforcement layer FR1-B and the (2-2)-th reinforcement layer FR2-B.

The digitizer DTM-2 according to an embodiment may offset steps formed by the reinforcement parts FRP-U and FRP-B, thereby providing a flat surface to components disposed above and/or under the digitizer DTM-2. Accordingly, it may be possible to provide an electronic apparatus with improved reliability.

In FIG. 11, differences from FIG. 9 will be mainly described.

Referring to FIG. 11, a digitizer DTM-3 according to an embodiment may include different materials for regions. For example, at least a portion of the digitizer DTM-3 may include an elastic material, and a remaining portion may include non-ferrous metal.

More particularly, in an embodiment, the digitizer DTM-3 may include a center part ST-M and peripheral parts FR-M1 and FR-M2.

In an embodiment, the center part ST-M may include at least a portion of a base part BM-3. The at least a portion of the base part BM-3 may include a folding part FM, a portion of a first non-folding part NFM1 extending from the folding part FM, and a portion of a second non-folding part NFM2 extending from the folding part FM.

In an embodiment, the first peripheral part FR-M1 may include the remaining portion of the first non-folding part NFM1, a (1-1)-th reinforcement layer FR1-U, and a (2-1)-th reinforcement layer FR1-B.

In an embodiment, the second peripheral part FR-M2 may include a remaining portion of the second non-folding part NFM2, a (1-2)-th reinforcement layer FR2-U, and a (2-2)-th reinforcement layer FR2-B.

In an embodiment, the center part ST-M and the peripheral parts FR-M1 and FR-M2 may be formed under high temperature (about 200° C.) and high pressure (about 10 bar) conditions, and may thus have an integral form. That is, the center part ST-M and the peripheral parts FR-M1 and FR-M2 may be provided as one-body.

The digitizer DTM-3 according to an embodiment may include an elastic material only in a region where a lot of deformations occur when folded.

Referring to FIG. 12, a digitizer DTM-4 according to an embodiment may include a base part BM-4 on which sensing coils RF and CF are disposed, and a reinforcement part PTL.

In an embodiment, the base part BM-4 may be provided in layers including different materials. The base part BM-4 may include a middle layer BS, a first upper base layer BU1, a second upper base layer BU2, a first lower base layer BB1, and a second lower base layer BB2.

In an embodiment, the first sensing coil RF may be disposed on an upper surface of the middle layer BS. The first upper base layer BU1 may be disposed on the middle layer BS to cover the first sensing coil RF. The second upper base layer BU2 may be disposed on the first upper base layer BU1.

In an embodiment, the first lower base layer BB1 may be disposed under the middle layer BS to cover the second sensing coils CF. In this embodiment, the first lower base layer BB1 may include an opening B-OP overlapping a folding part FM and passing through the first lower base layer BB1. Therefore, a lower surface BS-B of the middle layer BS overlapping the folding part FM may be exposed from the first lower base layer BB1 by the opening B-OP. The second lower base layer BB2 may be disposed under the first lower base layer BB1.

In an embodiment, the reinforcement part PTL may be disposed on an upper surface of the base part BM-4. The reinforcement part PTL may include a first reinforcement layer PT1 overlapping a first non-folding part NFM1 and a second reinforcement layer PT2 overlapping a second non-folding part NFM2. The first reinforcement layer PT1 and the second reinforcement layer PT2 may be spaced apart from each other along a second direction DR2, and may thus expose the upper surface B-U of the base part BM-4 overlapping the folding part FM. The reinforcement part PTL may include non-ferrous metal.

According to an embodiment, the middle layer BS, the first upper base layer BU1, the second upper base layer BU2, and the second lower base layer BB2 may each include an elastic material, and the first lower base layer BB1 may include the same material as the reinforcement part PTL.

In a digitizer according to an embodiment, an elastic material is disposed in a folding part where tensile and compressive stresses are repeated and most deformations occur, and accordingly, it may be possible to provide an electronic apparatus including a digitizer with improved folding characteristics.

Moreover, in an embodiment, since a separate hole/groove is omitted, resistance of coils disposed in the folding part may be reduced, and accordingly, it may be possible to provide an electronic apparatus including a digitizer with improved sensing reliability.

Although the embodiments of the invention have been described, it is understood that the invention should not be limited to these embodiments but various changes and modifications can be made by one ordinary skilled in the art within the spirit and scope of the inventive concept as hereinafter claimed. Therefore, the technical scope of the invention should not be limited to the contents described in the detailed description of the specification, but should be defined by the claims. Moreover, the embodiments or parts of the embodiments may be combined in whole or in part without departing from the scope of the invention.

What is claimed is:

1. An electronic apparatus comprising:
    a display module including a folding region foldable with respect to a folding axis extending in a first direction, and a first non-folding region and a second non-folding region which are spaced apart from each other along a second direction crossing the first direction with the folding region therebetween; and
    a digitizer disposed under the display module, wherein the digitizer includes:
        a base part including a plurality of base layers,
        first and second sensing coils each disposed between base layers of the plurality of base layers and insulated from each other, and
        an upper reinforcement part including a first reinforcement layer and a second reinforcement layer each of which is disposed on an upper surface of the base part and includes a different material from that of the base part, and which are spaced apart from each other along the second direction with the folding region therebetween,
    wherein at least a portion of the base part contains either synthetic rubber or polydimethylsiloxane (PDMS).

2. The electronic apparatus of claim 1, wherein the synthetic rubber is any one among styrene-butadiene rubber (SBR), butadiene rubber (BR), and butyl rubber.

3. The electronic apparatus of claim 1, wherein the upper reinforcement part includes a reinforced fiber composite material or a ceramic-based material, and
    wherein the reinforced fiber composite material is carbon fiber-reinforced plastic (CFRP) or glass fiber-reinforced plastic (GFRP).

4. The electronic apparatus of claim 1, wherein the digitizer further comprises a lower reinforcement part including a third reinforcement layer and a fourth reinforcement layer each of which is disposed on a lower surface of the base part, and spaced apart from each other along the second direction with the folding region therebetween.

5. The electronic apparatus of claim 4, wherein the digitizer further comprises a step compensation layer including a first compensation layer disposed between the first reinforcement layer and the second reinforcement layer to cover a portion of the upper surface of the digitizer exposed from the upper reinforcement part, and a second compensation layer disposed between the third reinforcement layer and the fourth reinforcement layer to cover a portion of the lower surface of the digitizer exposed from the lower reinforcement part.

6. The electronic apparatus of claim 5, wherein the step compensation layer comprises any one among thermoplastic polyurethane (TPU), thermoplastic elastomer (TPE), and polyvinyl chloride gel (PVC Gel).

7. The electronic apparatus of claim 4, wherein the digitizer comprises a folding part overlapping the folding region, a first non-folding part overlapping the first non-folding region, and a second non-folding part overlapping the second non-folding region,
    wherein the at least a portion of the base part is defined by the folding part, a portion of the first non-folding part extending from the folding part, and a portion of the second non-folding part extending from the folding region, and
    wherein a remaining portion of the base part includes a same material as the upper reinforcement part.

8. The electronic apparatus of claim 4, wherein the at least a portion of the base part and the remaining portion of the base part are connected to each other and have an integral shape.

9. The electronic apparatus of claim 1, wherein the base part comprises:
    a middle layer including the first sensing coils disposed on an upper surface thereof, and including the second sensing coils disposed on a lower surface thereof;
    an upper base layer disposed on the upper surface of the middle layer to cover the first sensing coils; and
    a lower base layer disposed on the lower surface of the middle layer to cover the second sensing coils, wherein the lower base layer includes a first lower base layer including an opening that overlaps the folding region and exposes the lower surface of the middle layer, and a second lower base layer disposed on a lower surface of the first lower base layer.

10. The electronic apparatus of claim 9, wherein the at least a portion of the base part comprises the upper base layer and the second lower base layer, and the first lower base layer includes a same material as the reinforcement part.

11. The electronic apparatus of claim 1, wherein the first and second sensing coils that are overlapping the folding regions have a same width as the first and second coils that are overlapping the first and second non-folding region.

12. The electronic apparatus of claim 1, wherein each of the first sensing coils and the second sensing coils have a line width of about 100 μm to about 400 μm.

13. The electronic apparatus of claim 1, wherein the base layers comprise:
    a middle layer including the first sensing coils disposed on an upper surface thereof, and including the second sensing coils disposed on a lower surface thereof;
    a first upper base layer disposed on the upper surface of the middle layer to cover the first sensing coils;
    a second upper base layer disposed on an upper surface of the first upper base layer;
    a first lower base layer disposed on the lower surface of the middle layer to cover the second sensing coils; and a second lower base layer disposed on a lower surface of the first lower base layer.

14. The electronic apparatus of claim 13, wherein the digitizer further comprises a first bridge pattern disposed on the first upper base layer, and connected to one of the first sensing coils through contact holes defined in the first upper base layer.

15. The electronic apparatus of claim 13, wherein the digitizer further comprises a second bridge pattern disposed on the first lower base layer, and connected to one of the second sensing coils through contact holes defined in the first lower base layer.

16. The electronic apparatus of claim 1, wherein the first sensing coils that are overlapping the folding regions have a shape which includes repeating valleys and crests, and
wherein a vertical distance between each of the valleys and the crests is about 1 μm or less in the first direction.

17. The electronic apparatus of claim 1, wherein the first sensing coils and the second sensing coils comprise copper (Cu).

18. The electronic apparatus of claim 1, further comprising a functional layer disposed under the digitizer and including a first part and a second part spaced apart from each other in a region overlapping the folding region,
wherein the functional layer includes at least one of a heat dissipation layer, a cushion layer, and a shielding layer.

19. The electronic apparatus of claim 1, wherein the digitizer detects an external input through electromagnetic resonance (EMR).

20. The electronic apparatus of claim 1, wherein when the folding region of the display module is folded to have a predetermined radius of curvature, the distance between the first non-folding region and the second non-folding region is less than twice the predetermined radius of curvature.

* * * * *